United States Patent [19]

Petzold et al.

[11] Patent Number: 5,062,050
[45] Date of Patent: Oct. 29, 1991

[54] CONTINUOUSLY VARIABLE TRANSMISSION LINE PRESSURE CONTROL

[75] Inventors: Werner P. Petzold, Harwood Heights, Ill.; William P. Umlauf, Schererville, Ind.

[73] Assignee: Borg-Warner Automotive, Inc., Sterling Heights, Mich.

[21] Appl. No.: 422,588

[22] Filed: Oct. 17, 1989

[51] Int. Cl.$^5$ .............................................. B60K 41/22
[52] U.S. Cl. ................................. 364/424.1; 74/866; 192/3.58
[58] Field of Search ............... 364/424.1; 74/866, 867; 192/0.056, 0.076, 3.58, 0.042, 0.048; 474/12, 18, 28

[56] References Cited

U.S. PATENT DOCUMENTS

| | | |
|---|---|---|
| 4,433,594 | 2/1984 | Smirl . |
| 4,458,318 | 7/1984 | Smit et al. . |
| 4,462,275 | 7/1984 | Mohl et al. . |
| 4,542,665 | 9/1985 | Yamamuro et al. . |
| 4,566,354 | 1/1986 | Kumura et al. . |
| 4,583,627 | 4/1986 | Kumura et al. . |
| 4,631,043 | 12/1986 | Tokoro et al. . |
| 4,648,496 | 3/1987 | Petzold et al. . |
| 4,653,621 | 3/1987 | Oshiage . |
| 4,718,012 | 1/1988 | Oshiage ........................... 364/424.1 |
| 4,718,308 | 1/1988 | Haley ..................................... 74/866 |
| 4,729,103 | 3/1988 | Oshiage et al. ................... 364/424.1 |
| 4,734,082 | 3/1988 | Tezuka ................................... 74/867 |
| 4,764,156 | 8/1988 | Ohkumo ................................ 74/866 |
| 4,798,561 | 1/1989 | Hattori et al. ......................... 74/867 |
| 4,811,225 | 3/1989 | Petzold et al. . |
| 4,856,380 | 8/1989 | Murano et al. ................... 364/424.1 |
| 4,926,716 | 5/1990 | Hirano et al. ..................... 364/424.1 |
| 4,947,970 | 8/1990 | Miller et al. ........................... 74/866 |
| 4,956,776 | 9/1990 | Carre ................................. 364/424.1 |
| 4,958,538 | 9/1990 | Yamashita et al. ................... 74/866 |
| 4,982,822 | 1/1991 | Petzold et al. ................... 364/424.1 |

FOREIGN PATENT DOCUMENTS 0139277 10/1984 European Pat. Off. .
0196807 3/1986 European Pat. Off. .

Primary Examiner—Salvatore Cangialosi
Attorney, Agent, or Firm—Hugh A. Abrams; Greg Dziegielewski

[57] ABSTRACT

A line pressure control system for a continuously variable transmission which includes a continuously variable member, a clutch and a pressure transducer for providing a feedback signal for both closed loop line pressure and closed loop clutch control. The line pressure control system includes a closed loop control strategy and an open loop control strategy which operate independently, and initial conditions are determined and set to prevent discontinuities in the output. The closed loop control strategy includes proportional and integral gain terms. The control system is adaptable to utilize of a variety of different open loop control strategies to provide a schedule response to a desired line pressure or a maximum or minimum line pressure when appropriate. The control system also optionally provides for a transition from closed loop control to open loop control and vice versa in response to the output parameters generated.

46 Claims, 14 Drawing Sheets

CONTINUOUSLY VARIABLE TRANSMISSION LINE PRESSURE CONTROL

BACKGROUND OF THE INVENTION

1. Field of the Invention

The invention relates to continuously variable transmission systems in which control of the line pressure is effected by both open and closed loop control strategies, the selection being dependent upon the operating conditions of the continuously variable transmission and the clutch. More particularly, the invention relates to a line pressure control strategy in a continuously variable transmission in which a single pressure sensor is used to provide signals for closed loop control of both the clutch pressure regulator and the line pressure regulator and in which open and closed loop controls are operated independently of one another.

2. Description of the Prior Art

There are numerous examples of the operation and construction of continuously variable transmissions (CVTs). For example, U.S. Pat. No. 4,458,318, entitled "Control Arrangement for a Variable Pulley Transmission" and U.S. Pat. No. 4,522,086, entitled "Control System for Continuously Variable Transmission" describe the mechanics of and controls for a CVT system utilizing two adjustable pulleys, each pulley having at least one sheave which is movable and another sheave that is axially fixed with respect to the other. A flexible belt of metal or elastomeric material having a fixed width intercouples the pulleys. The inner faces of the sheaves of the pulleys are bevelled or chamfered so that as the axially displaceable sheave moves relative to the fixed sheave, the effective pulley diameter may be adjusted.

The displaceable sheave includes a fluid constraining chamber for receiving fluid to move the sheave and thus change the effective pulley diameter. As fluid is forced into or exhausted from the chamber, the pulley diameter is either increased or decreased. Generally the effective diameter of one pulley is moved in one direction as the effective diameter of the other pulley is moved in the other. This enables the ratio between the pulleys to be adjusted.

Developments in CVTs have resulted in improved hydraulic control systems. One such control system is described in U.S. Pat. No. 3,115,049. This patent discloses the regulation of the adjustable sheave of the secondary, or driven, pulley to control the belt tension to protect the sheaves from belt slippage that might result in damage to the belt or pulleys. A different hydraulic circuit, controls the fluid into and out of the primary, or driving, pulley. The change in position of the movable sheave of the primary pulley regulates the transmission ratio. U.S. Pat. No. 4,152,947 also describes control of a CVT. In both systems, the pressure of the fluid applied to hold the belt tension is kept at a relatively high value. An improved control system was subsequently developed to reduce the main line fluid pressure supplied to the secondary sheave chamber in accordance with torque demand. When the torque demand is lower, the tension in the belt necessary to prevent slippage is lower than at high torque demand. This improved system is disclosed in U.S. Pat. No. 4,522,086 entitled "Control System for Continuously Variable Transmission" assigned to the assignee of the present application.

Further work resulted in an improved control system which reduced the line pressure applied to the secondary chamber to a lower operating pressure and also provides a lower control pressure for other portions of a hydraulic control system. This system is described in a copending application Ser. No. 421,198, filed Sept. 22, 1982 now U.S. Pat. No. 4,717,953 and assigned to the assignee of the present application.

Copending application entitled "Control System For Controlling The Line Pressure In A Continuously Variable Transmission", Ser. No. 936,527, filed Dec. 1, 1986, also assigned to the assignee of the present application describes a system for controlling the line pressure in a continuously variable transmission. The system employs a single pressure transducer to realize closed loop control of both the line (secondary) pressure and the clutch pressure. An open loop controller takes over control of the line pressure if the response of the closed loop control is not fast enough to effect desired changes in the line pressure. This prevents belt slippage and consequent damage to the primary and secondary pulleys. In open loop control, an interpolation algorithm is utilized to control the line pressure, thereby reducing the amount of data that must be stored.

The teachings of each of the above referenced patents are incorporated herein by reference. In the control system disclosed in application Ser. No. 936,527, the closed loop control strategy utilizes a signal received from an open loop schedule to regulate the response. This manner of regulation is not as efficient as the utilization of completely closed loop control. It is desirable therefore to provide a control system in which improved efficiency is achieved in closed loop operation.

The stored data required for operation of the previous control system, although reduced because of the interpolation schedules utilized is still relatively large. It is therefore desirable to provide a control system that utilizes a simplified algorithm requiring minimal stored data for fast efficient operation.

Pulse width modulating solenoid valves, such as those often used to control the line pressure in a CVT, tend to be extremely non-linear when operated at high duty cycles of 85-95%. This is due to the response time limitation of the valve. Closed loop operation that results in a duty cycle between these values may cause unstable closed loop control. It is desirable therefore to provide a system that can operate in these conditions without creating unstable operating conditions.

It has also been discovered that problems can arise with the prior control system at the transition between open and closed loop controls. Discontinuities in the output duty cycle are possible that can cause undesirable jumps in the line pressure. It is also desirable therefore to provide a control system that does not produce discontinuities in the output duty cycle at transitions between control modes.

In addition, the prior control system of application Ser. No. 936,527, now U.S. Pat. No. 4,982,822, issued Jan. 8, 1991 for "Control System For Controlling the Line Pressure In A Continuously Variable Transmission," incorporates elements designed to slow the system's response in closed loop control in order for it not to respond to dynamic effects in the hydraulic circuit. The closed loop control strategy will not therefore respond effectively to relatively fast changes in the desired set point. It has been discovered that the dynamic effects resulting from the distance between the pressure transducer and the secondary sheave can be neglected. It is therefore desirable to provide a control system that operates to respond quickly and efficiently to sudden changes in the desired pressure set point under closed loop control.

OBJECTS OF THE INVENTION

Accordingly, it is an object of the present invention to provide an improved control system for regulating the line pressure in a continuously variable transmission which generally overcomes the shortcomings and deficiencies of the prior art.

It is a specific object of this invention to provide a versatile and efficient control system for regulating the line pressure in a continuously variable transmission.

It is another object of this invention to provide a line pressure control system that implements simplified algorithms without sacrificing system stability.

It is a further object of this invention to provide a control system for regulating line pressure in a CVT that gives improved efficiency in closed loop operation.

It is yet another object of this invention to enable transition from open loop to closed loop control to be effected without discontinuity in the output signal.

It is a further object of this invention to provide a control system for regulating line pressure in a CVT that gives improved efficiency in closed loop operation.

It is yet a further object of this invention to provide a line pressure control system that responds quickly in closed loop control to sudden changes in the desired line pressure set point.

It is still a further object of this invention to provide a line pressure control system that can operate in a wide range of conditions without creating unstable operating conditions.

Other objects, advantages and features of this invention will become apparent on reading the following description and appended claims, and upon reference to the appended drawings.

SUMMARY OF THE INVENTION

The present invention provides a line pressure control system for controlling the line pressure in a continuously variable transmission, in which fluid under line pressure is regulated to provide pressure to the secondary sheave to maintain pressure in the belt and to produce an adjustable clutch fluid pressure for operating a clutch to transfer drive torque from an engine through the transmission to an associated drivetrain. The system has a pressure transducer operable to sense the clutch fluid pressure. The control system includes a closed loop pressure control strategy responsive to said sensed clutch fluid pressure, at least one open loop pressure control strategy and means to select one of the control strategies. Each of the control strategies is independently operable to provide an output signal representative of a required line pressure.

After clutch lock-up, the clutch fluid pressure and the secondary pressure are the same and the sensed clutch fluid pressure determined by the pressure transducer can be used to provide a measure of the actual line pressure. This enables closed loop control to be effected during periods when the clutch is locked up. The closed loop control may include a proportional and an integrator term summed to provide an output signal. Each term is a function of the pressure error derived from a comparison between the desired line pressure set point and the measure of the actual line pressure. The gains used to calculate these terms are determined to provide a system response optimized for the line pressure regulator valve utilized by the system and may be functions of temperature if required. The provision of an output signal including both a proportional and an integrator gain term enables the output signal to be produced without input from an open loop control strategy, thereby providing a more efficient response and removing constraints from the signals generated by an open loop control strategy.

Open loop control may be implemented by one or more of a variety of different control strategies. In accordance with one embodiment of this invention, the open loop control is provided by a control strategy that provides an output signal representative of a maximum line pressure and a control strategy that provides an output signal representative of a minimum line pressure. The system operates in the maximum line pressure, minimum line pressure or closed loop control strategy in response to an outside determination of the control system to provide the output signal appropriate for the given transmission conditions. By providing output signals corresponding only to maximum and minimum line pressures in open loop control, the data stored in the control algorithm can be kept to a minimum leaving storage capacity free for other utility.

In accordance with another embodiment of this invention, the open loop control is implemented solely by an open loop schedule that provides an output signal representative of a required line pressure in response to a desired line pressure setpoint. In accordance with yet another embodiment of the invention, the open loop control is effected by both maximum and minimum output control strategies and by an open loop schedule. Both these embodiments provide versatility in the response that can be generated by the system to enable more efficient operation to be achieved during open loop control when required.

One aspect of the present invention provides for initial conditions in the closed loop control strategy to be set each time the system makes a transition from an open loop control strategy into closed loop control or from another control strategy into an open loop schedule. This facility ensures that there are no discontinuities in the output signal on transition and provides for stable response in the system.

As previously discussed, it has been found that pulse width modulating solenoid valves, such as those often used to control the line pressure in a CVT, have a tendency to be extremely non-linear when a duty cycle of between 85-95% is received resulting in unstable closed loop control when output signals from a control system corresponding to an output duty cycle falling within these limits are generated. To overcome this problem, in another aspect of the present invention, a transition from closed to open loop maximum line pressure control is achieved in response to the output signal generated during closed loop control.

A return to closed loop control occurs when the desired line pressure set point falls below the level of the output signal that initiated a transition to open loop maximum line pressure control. This is achieved by saving a value representative of the clutch pressure on transition to open loop maximum control and comparing the stored value with the desired line pressure set point for each of the open loop maximum pressure cycles. The system returns to closed loop control when the pressure set point falls below the stored pressure measure.

BRIEF DESCRIPTION OF THE DRAWINGS

For a more complete understanding of this invention, reference should now be made to the embodiment illustrated in greater detail in the accompanying drawings and described by way of example only. In the drawings.

DETAILED DESCRIPTION OF THE INVENTION

Figure 1:
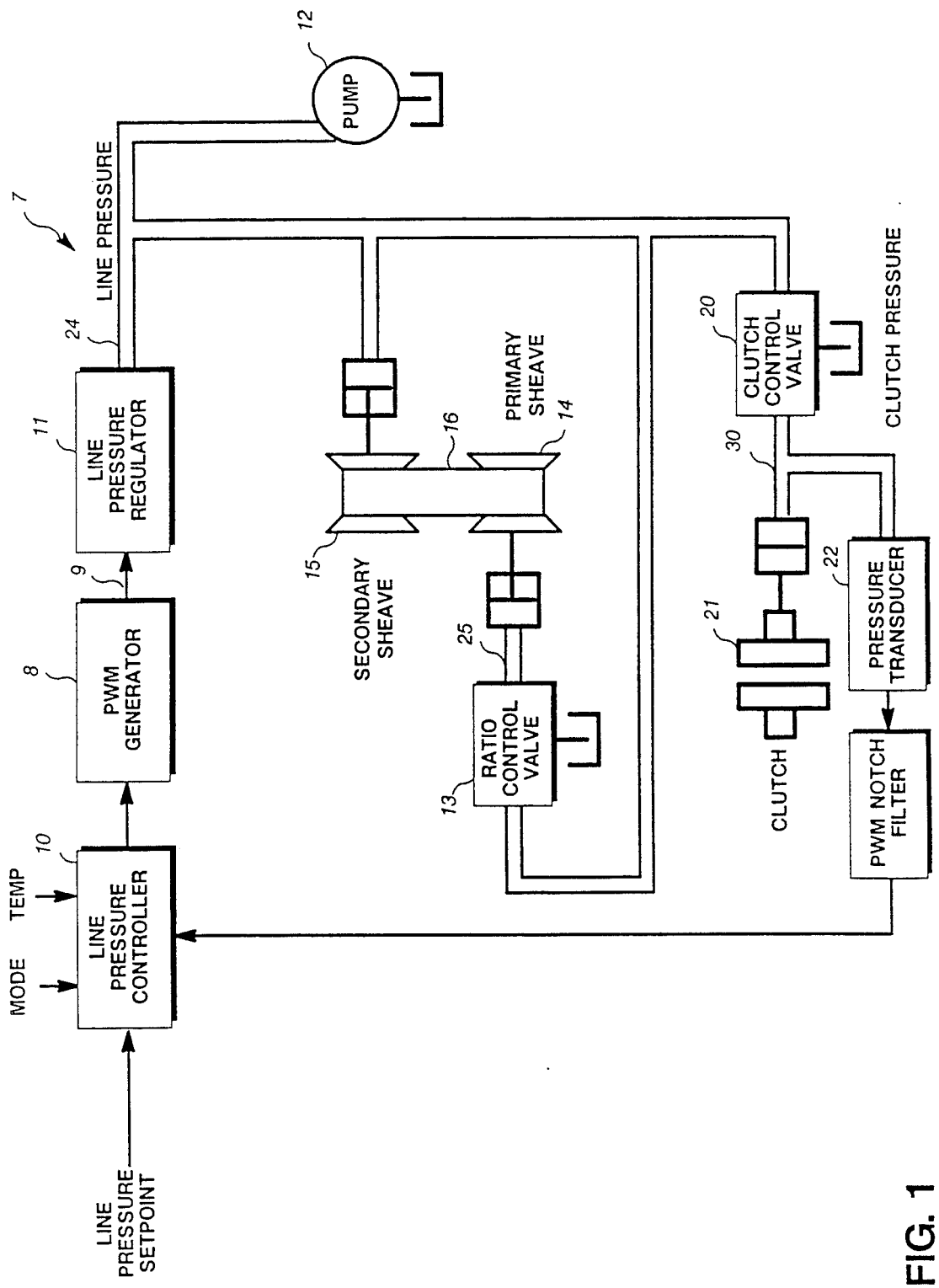
FIG. 1 is a block diagram representation of a continuously variable transmission control system.

Turning to FIG. 1, a block diagram representation of the hydraulic system of a continuously variable transmission system CVT 7 can be seen. The diagram is simplified to show the relation of the hydraulic circuit to the regulatory elements of the system. The diagram is schematic in that it does not show the actual physical relation between the components. Reference to copending U.S. patent application Ser. No. 936,527, now U.S. Pat. No. 4,982,822, mentioned above and incorporated herein by reference will show clearly how the elements are related with respect to the power train of a vehicle. In particular the relation between the clutch that regulates the torque supplied to the output shaft to drive the wheels of the vehicle, and the primary pulley which receives the torque from the engine, is described.

A pulse width modulation (PWM) generator 8 produces an output duty cycle on line 9 in response to an output signal from a line pressure controller 10. A line pressure regulator 11 typically including a PWM controlled solenoid valve controls the fluid line pressure in the hydraulic system. A pump 12 provides fluid flow to the hydraulic system. This pressure is modified by the line pressure regulator 11.

A ratio control valve 13 regulates flow from the line pressure to provide the correct fluid pressure to the primary sheave 14 for regulating the ratio between the primary sheave 14 and the secondary sheave 15 for controlling the speed and torque of an output drive shaft (not shown). The line pressure on line 24 provides pressure at the secondary sheave 15 to determine the tension in the metal or elastomeric transmission belt 16 that connects the primary and secondary sheaves. The tension in the belt 16 must be high enough to prevent its slipping and damaging the sheaves or itself.

The clutch control valve 20 regulates flows from the line pressure for control of the pressure applied at the clutch 21. By varying the clutch pressure, the torque transmitted to the output shaft (not shown) is further modified for given engine operating conditions. Again, the operation of the ratio control valve 13 and the clutch control valve 20 and the control circuits utilized in their regulation are described in more detail in the patents and application referenced herein, particularly in U.S. patent applications Ser. Nos. 936,527, now U.S. Pat. No. 4,982,822, and 07/025389 filed Dec. 1, 1986 and Mar. 13, 1989 respectively.

A pressure transducer 22 situated in the hydraulic circuit after the control valve 20 is utilized in a manner similar to that described in application Ser. No. 936,527, now U.S. Pat. No. 4,982,822. The pressure reading from the transducer can be used as a feedback signal for regulation of the clutch pressure or the line pressure dependent upon the condition of the clutch valve 20. The condition of the valve 20 is, in turn, responsive to the operating conditions of the engine.

When the clutch control valve 20 is being utilized to reduce the fluid pressure at the clutch 21, to either release the clutch so that no torque is transferred to the output shaft or allow the clutch to slip so that a reduced torque is supplied to the output, the signal from the pressure transducer is only representative of the clutch pressure. This signal could therefore be used as a feedback signal for the clutch control valve 20. It could not, however, be used as a feedback signal for the line pressure control strategy as it would not be a legitimate representation of the line pressure.

In modes of operation when the clutch control valve 20 is fully open and the clutch locked up, e.g. in a drive mode, the signal from the pressure transducer is representative of the actual line pressure and can therefore be used as a feedback signal for the line pressure control strategy. The line pressure at the clutch when the clutch control valve is fully open, is sufficiently high to ensure that the clutch is locked-up and no slippage occurs so that the full torque from the secondary sheave 15 is transferred to the output drive shaft. Although under these conditions the signal from the pressure transducer is representative of the actual line pressure, it may be necessary to modify the signal to account for possible loss in pressure due to leakage at the clutch control valve 20.

In operation, the line pressure controller 10 receives information regarding the operational mode of the transmission, the temperature of the system and the desired pressure set point for the current conditions. The line pressure controller 10 implements the control functions for controlling the hydraulic fluid flow to generate an output signal that is transformed by the pulse width modulation (PWM) control generator 8 to provide a duty cycle to which the line pressure regulator 11, typically including a PWM valve, is responsive.

The electronic line pressure controller 10 operates in logical fashion to provide the required line pressure for the current operation conditions on line 24. The clutch control valve 20 utilizes the signal from the pressure transducer 22 to regulate the pressure on line 30 appropriate for the desired amount of clutch slippage.

Figure 2:
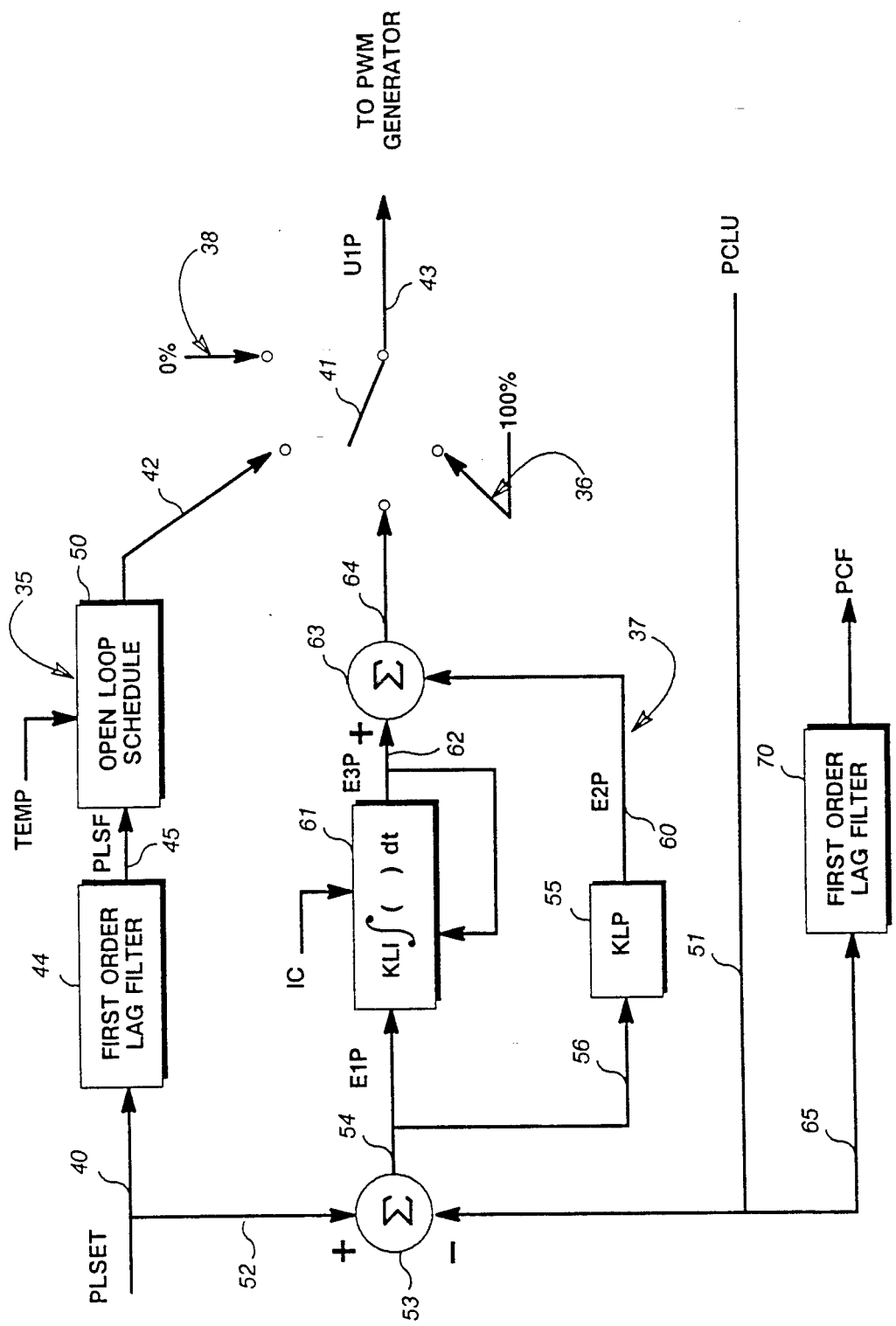
FIG. 2 is a block diagram representation of one embodiment for line pressure control in a continuously variable transmission system according to the present invention.
Figure 3A:
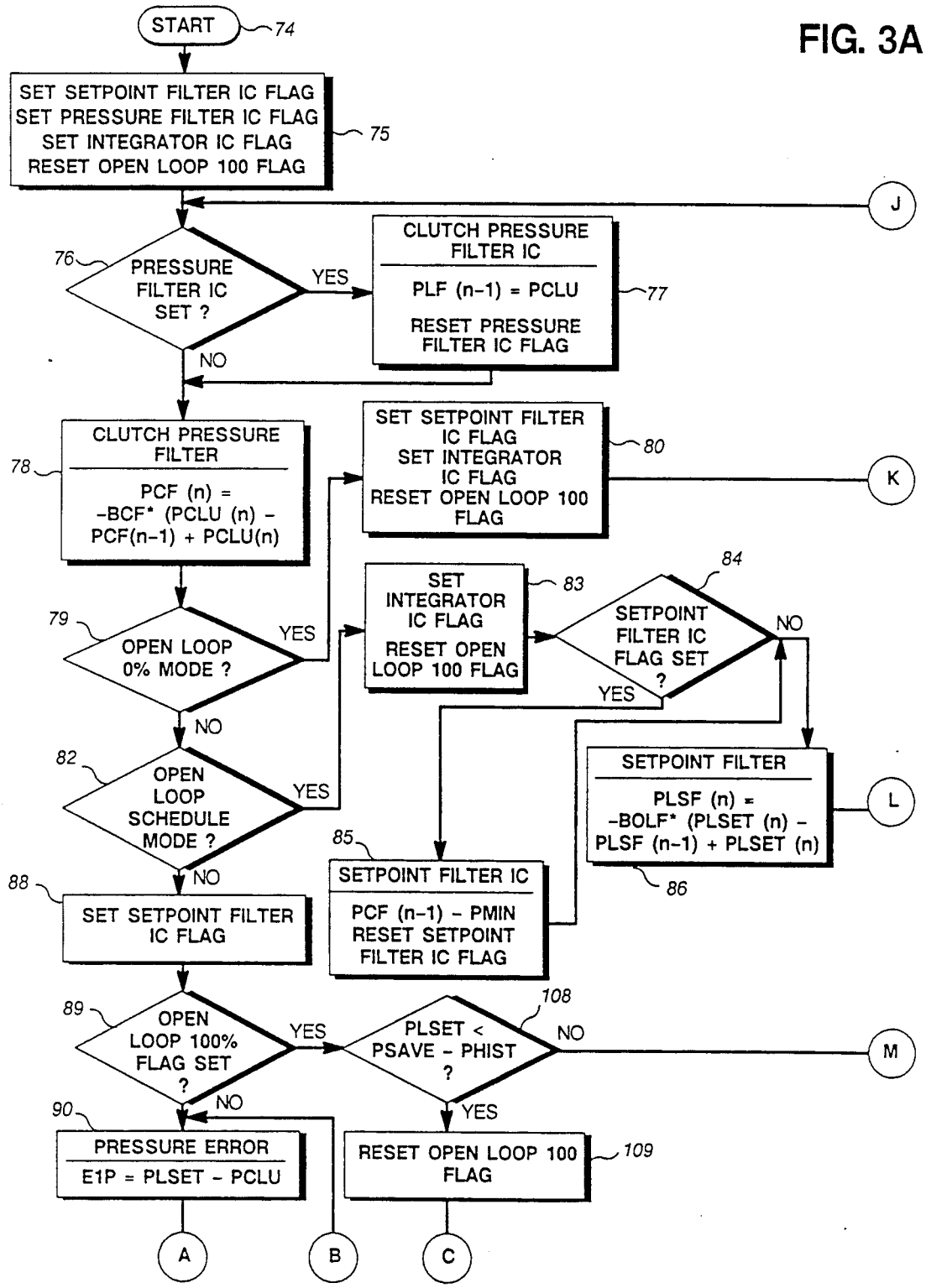
FIGS. 3A, 3B, 3C and 3D are flow charts of the operation of the embodiment of FIG. 2.
Figure 3B:
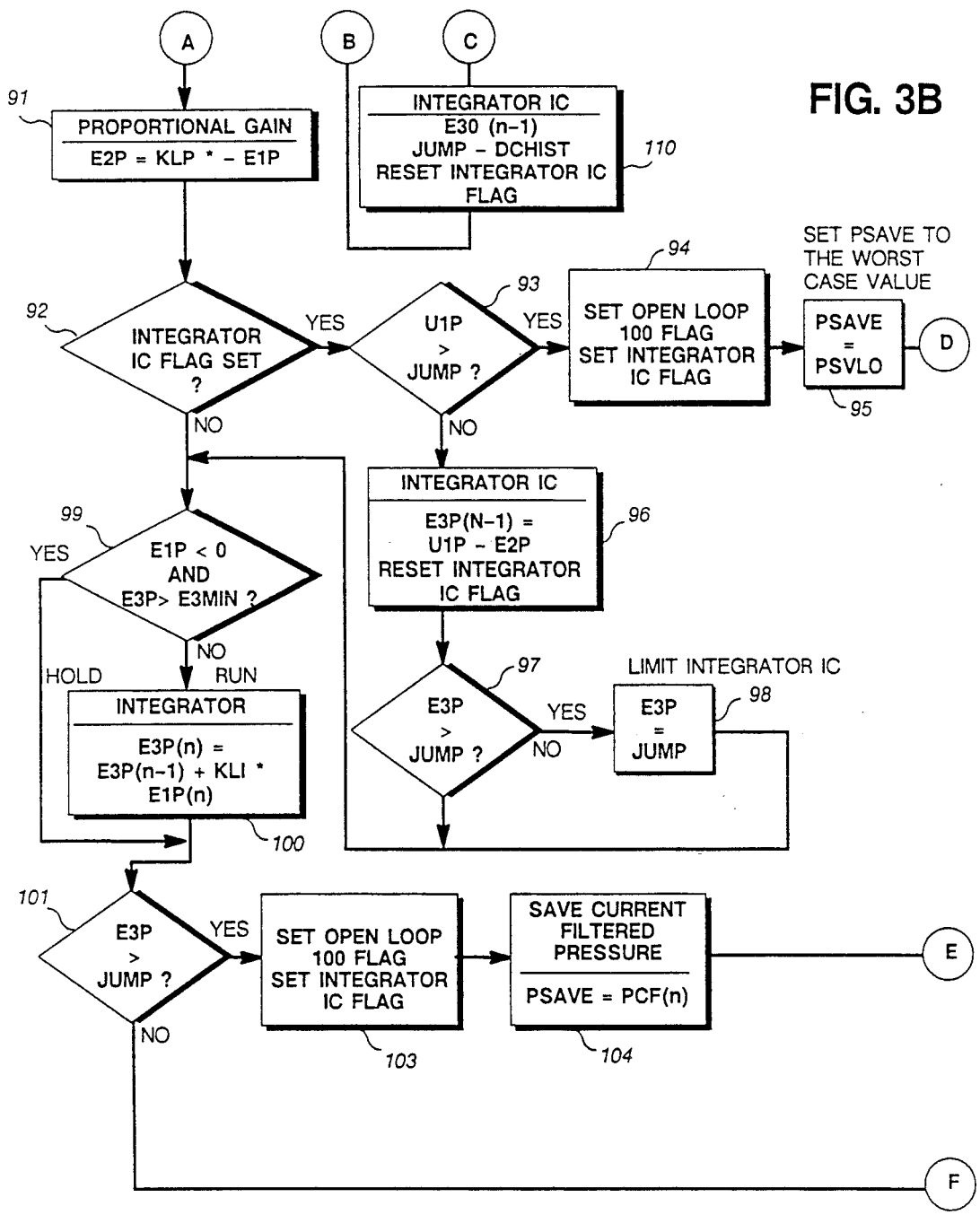
Figure 3C:
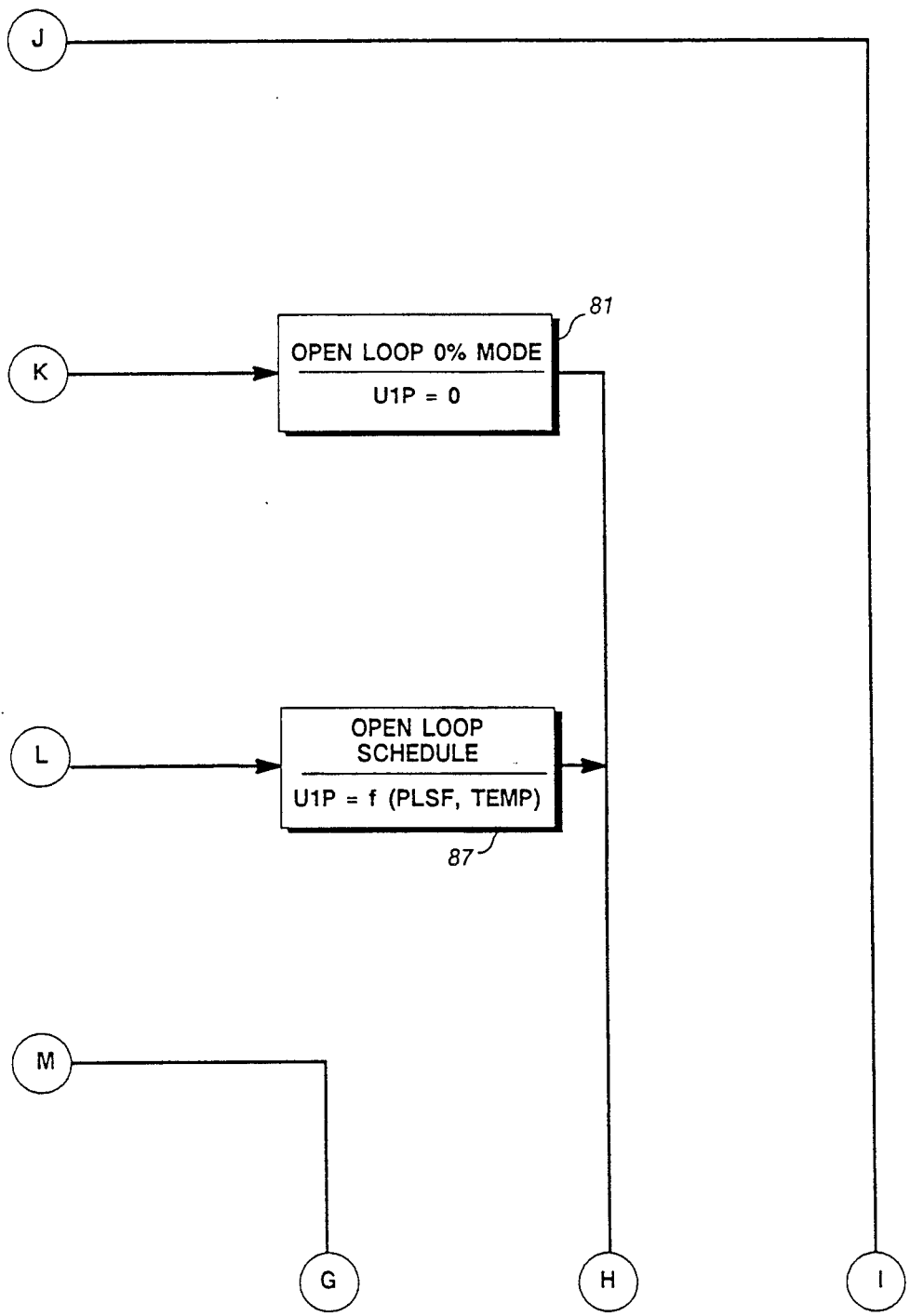
Figure 3D:
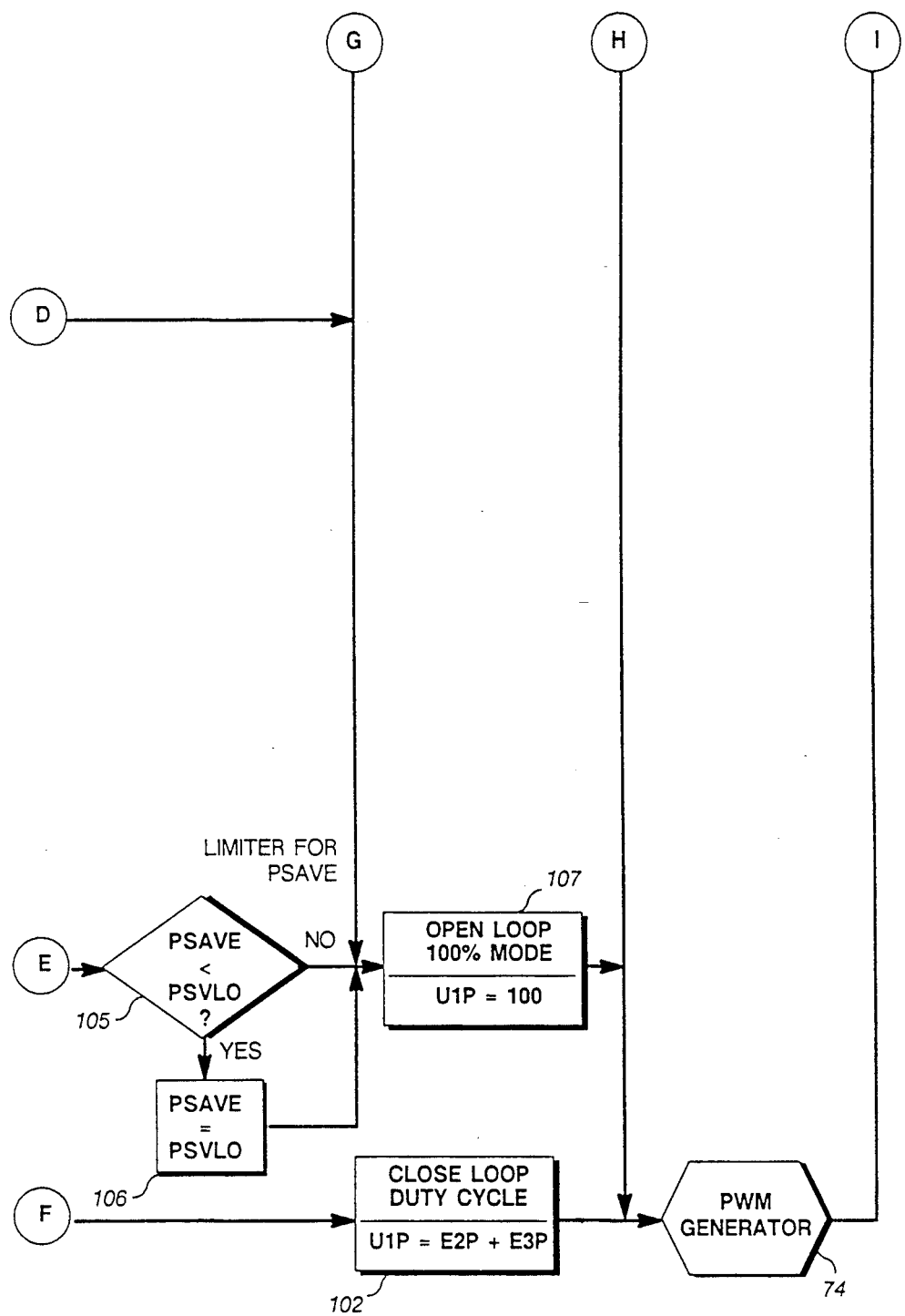

The electronic line pressure controller 10, one embodiment of which is shown in more detail in FIG. 2, has a number of control strategies the choice of which is dependent upon the mode of operation of the transmission control system. There are four operational modes that can be split into two categories, OPEN and CLOSED.

OPEN LOOP 0% CONTROL STRATEGY: This control strategy performs open loop control that provides an output signal that generates a full-off duty cycle signal that is delivered to the PWM valve. This prompts the PWM valve to deliver the minimum line pressure to the system. This control strategy is used when the transmission is, for example, in neutral.

CLOSED LOOP CONTROL STRATEGY: The clutch pressure is used to perform the closed loop line pressure control. If the pressure drop across the clutch control valve 20 is negligible, then the pressure sensed by the pressure transducer 22 can be used directly. If, however, the pressure drop is not negligible, a calibration gain typically dependent upon fluid temperature must be used to provide an accurate representation of the line pressure. Unlike prior control systems, the closed loop control strategy does not include elements to slow the system's response, as it has been found that there is no significant delay resulting from the distance between pressure transducer 22 and the clutch control valve 20. A filtered value of the clutch pressure is used directly to determine the pressure error. The closed loop control strategy is capable of responding rapidly to sudden changes in the desired pressure set point. A proportional-integral control strategy is used to provide the output signal in response to the difference between the desired and actual line pressures. Closed loop control can only be used when the clutch valve 20 is fully opened. The utilization of closed loop control is also constrained by the characteristics of the PWM solenoid valve in the line pressure regulator 11 that may have a tendency to jump to a full-on pressure when delivered a duty cycle of between 85% and 95% by the PWM generator. Closed loop operation at this jump value results in unstable control and should be avoided. When, however, the required operating pressures do not generate duty cycles above the jump value this characteristic of the PWM valve of course causes no problem.

OPEN LOOP 100% CONTROL STRATEGY: The system performs open loop control and delivers an output signal corresponding to a full-on duty cycle signal to the PWM generator that provides a suitable duty cycle to the PWM valve. The valve then provides a maximum line pressure in the hydraulic system. This control strategy can be used during start-up if small losses in efficiency can be tolerated. It can also be utilized in extremely cold conditions when the regulator dynamics are too slow to enable a fast but stable response to be possible in closed loop control. Alternatively in one embodiment of this invention, this control strategy can be used as an alternative to closed loop control when the output is generating a steady state duty cycle greater than the jump value of the PWM solenoid valve. On transition from closed loop control to this control strategy under these circumstances, the filtered value of the clutch pressure is stored in the algorithm, so that when the line pressure set point drops below this stored level, plus a small factor for hysterisis, closed loop control is resumed.

OPEN LOOP SCHEDULE CONTROL STRATEGY: This can be used during start up as an alternative to the 100% control strategy if small losses during start up cannot be tolerated. It can also be entered as an alternative to the 100% open loop control strategy for operation in conditions of extreme cold. The schedule control strategy utilizes tables to perform linear interpolations as a function of pressure set point and temperature to calculate the output signal that will produce the required duty cycle for the PWM valve. The tables are biased so as always to yield a higher pressure than the set point requires. This is necessary because in open loop control, there is no effective method of discerning the actual line pressure and if insufficient pressure is delivered to the secondary pulley, the transmission pulley may slip causing damage to the belt and sheaves.

Referring now to FIG. 2, a block diagram representation of a system for providing line pressure control in accordance with one embodiment of the present invention is shown. A signal representing the desired pressure set point (PLSET) is provided on line 40. This is the line pressure that should be delivered to the secondary sheave at any time to ensure that the CVT belt will be adequately tensioned to prevent slippage. The line pressure must not, however, provide such a high pressure that efficiency suffers. The line pressure set point is a function of the engine torque and the transmission ratio that should be maintained by the belt.

The engine torque is calculated from an engine map that is stored in the electronic control system. The map effectively has a series of throttle setting curves on a plane where the engine speed can be the abscissa or ordinate and the engine torque is represented on the other axis. As both the engine speed and the throttle setting are continually monitored, those parameters can be utilized to determine, from the map, the value of the torque produced by the engine. The belt ratio is determined from the engine speed and the clutch input speed.

The four control strategies are operated in accordance with the operational mode of the transmission at that time. Only one of the control strategies can be operational at any one time although an important feature of this embodiment resides in the fact that particular conditions generated during the operation of one of the control strategies can trigger a switch to another. Logic switch 41 controls the implementation of the appropriate operational mode.

During start-up, in this embodiment of the invention, the logic switch 41 connects line 42 to the output line 43 to provide a signal generated in the open loop schedule 35 to the PWM generator to regulate the line pressure in the hydraulic system. Other means of regulating the line pressure, such as the open loop 100% control strategy 36 could, however, be used during start-up. This alternative is described in greater detail later in relation to the alternative embodiment of FIGS. 5 and 6.

The open loop schedule control strategy 35 takes the desired pressure set point PLSET which is filtered at the first order lag filter 44 to give a filtered value PLSF. The filtered value PLSF is used in this controller to slow down the rate of change of the line pressure during start mode. This is important to prevent an undesirable clutch feel, or bump. The PLSF signal on line 45 is fed into the open loop schedule 50 along with the value of the fluid temperature to provide an output signal representative of the required line pressure. The operation of the open loop schedule will be described in greater detail later.

Once clutch lock-up is achieved (for example, in a drive mode) the system may utilize closed loop control strategy 37, since the pressure determined by the pressure transducer PCLU is, under these conditions, representative of the line pressure. In this embodiment it is assumed that the leakage across the clutch control valve is sufficiently small to be negligible. The signal derived from the transducer PCLU is therefore compared with the PLSET to provide an error signal. If, however, there is found to be a significant pressure drop across the clutch control valve, the pressure signal can be multiplied by a calibration gain to provide a signal better representative of the actual line pressure. The calibration gain is obtained experimentally for each particular valve and is a function of the oil temperature. Embodiments including this feature of the invention are described later.

The measured line pressure signal PCLU on line 51 is subtracted from the PLSET signal on line 52 at summing junction 53 to provide an error signal E1P on line 54. The error signal E1P is fed into the gain control box 55 along line 56 where the signal is multiplied by the proportional gain KLP to provide an output signal E2P on line 60. The error signal E1P is also fed into the integrator 61 where the signal is integrated and multiplied by the integrator gain KLI to give a second output signal E3P on line 62. The signals E2P and E3P are summed at summing junction 63 to provide an output control that is delivered to the PWM generator on line 43. Both the gains KLP and KLI are derived from considerations of the transfer function of the regulator valve and are adjusted to optimize the response of the system to change in line pressure or line pressure setpoint.

The open loop 100% control strategy 36 is entered in response to the generation of an output signal in closed loop control corresponding to a duty cycle greater than the jump value of the PWM solenoid valve in regulator 11. This control strategy provides an output signal corresponding to a 100% duty cycle and a maximum line pressure.

The open loop 0% control strategy 38 operates when, for example, the transmission is in neutral. The logic switch 41 then connects the open loop 0% control strategy to the PWM generator, the output signal generated by the control strategy is transformed into a full-off duty cycle by the PWM generator and is translated into a minimum line pressure in the hydraulic system when received by the regulator valve 11. Neither the open loop 100% nor the open loop 0% control strategies utilize the PLSET signal on line 40.

Figure 4:
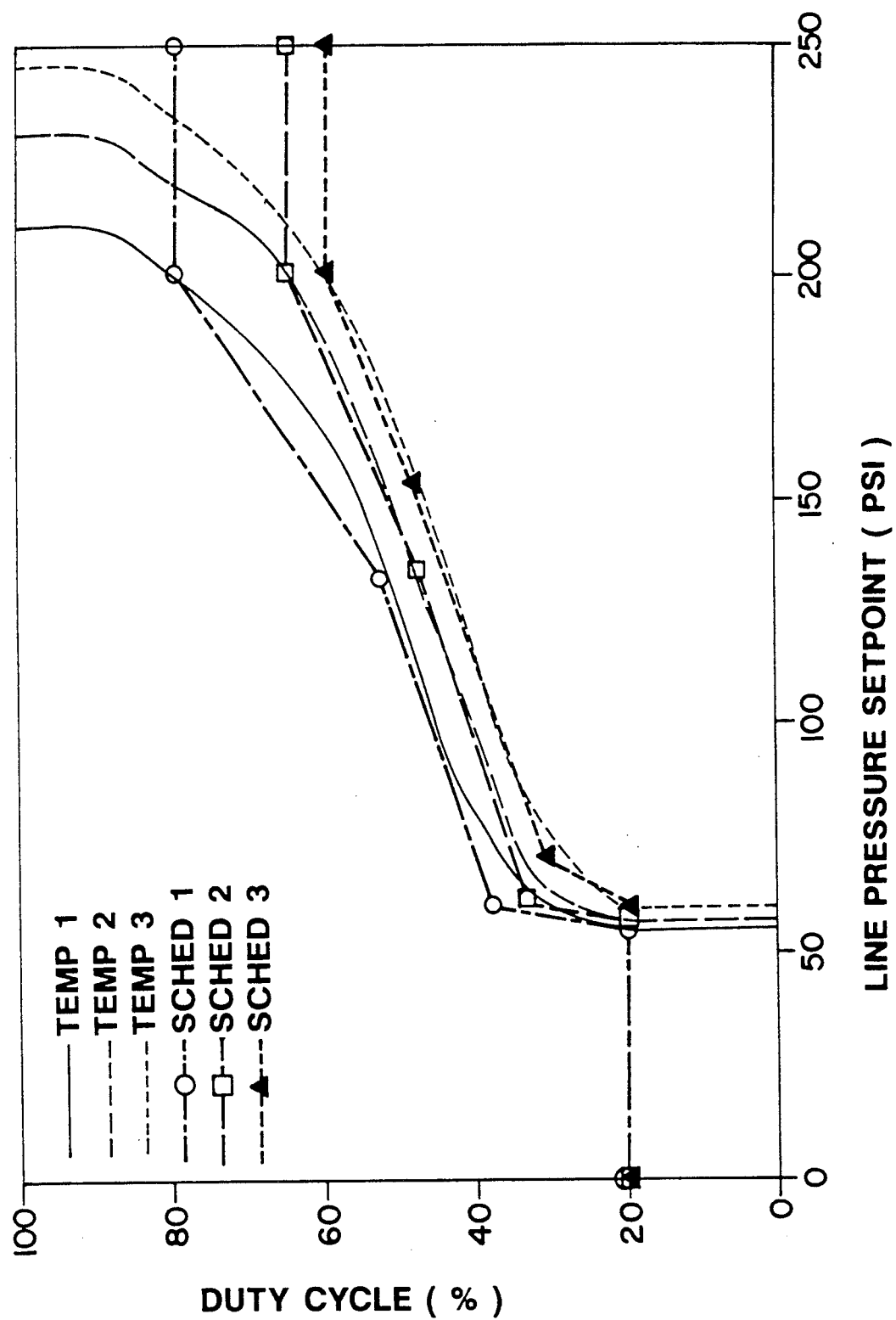
FIG. 4 is an exemplary open loop duty cycle schedule for use in the embodiment of FIGS. 2 and 3 or FIGS. 7 and 8 showing line pressure set point plotted against duty cycle for different temperatures.

The manner in which various functions of this embodiment of the system can be implemented in software and programmed into microcomputer software can be seen by reference to the logic flow chart of FIG. 3 and the open loop schedule of FIG. 4. The microcomputer circuitry will respond to a variety of different parameters and variables in controlling the continuously variable transmission. However, only those portions and subroutines that deal with the present invention are, however, illustrated.

Turning to FIG. 3, from the start block 74 the system proceeds to block 75 where IC (initial condition) flags are set. This is the condition for the flags that initiates a determination of the initial conditions each time one of the various modes of operation is reentered or entered for the first time. The open loop 100 flag is also reset at block 75. The system then advances to block 76 where, on the first time through the cycle, the pressure filter flag is set and block 76 advances the system to block 77 where the initial conditions for the clutch pressure are set. The initial value of the filtered clutch pressure is set equal of the actual value of the clutch pressure. As this information is only utilized in closed loop control, i.e. when the clutch is locked up, this value will be representative of the line pressure. Once the initial conditions for the pressure filter have been set, block 77 resets the pressure filter IC flag so that on subsequent cycles block 77 will be by-passed.

The system then advances to block 78 where the clutch filter pressure is determined. The filtered pressure is calculated by subtracting the value of the filtered clutch pressure in the previous cycle (the initial condition in the case of the first cycle) from the clutch pressure reading, multiplying the result by constant—BPCF (the filtered clutch pressure), and adding the clutch pressure reading. This filtered clutch value will only be utilized during the closed loop control and ensures a stable response is achieved.

The system then continues to block 79 where it determines whether the system is to be operated by the open loop 0% control strategy. The selection of the control strategy will be made outside this subroutine and will be determined by the operating conditions. If, for example, the transmission is in neutral, the control strategy will be the open loop 0% control strategy and the "yes" branch will be taken at decision block 79. The initial conditions flags for the set point filter, and the integrator are then set and the open loop 100% flag is reset at block 80. From block 80 the system progresses to block 81 where the output signal U1P, on line 43 of FIG. 2, is set to zero to generate output duty cycle at the PWM generator 74 corresponding to a minimum duty cycle. The zero output signal U1P causes the PWM generator to provide full-off output duty cycle that regulates the line pressure through the PWM solenoid valve line pressure regulator 11 shown in FIG. 1 to provide a minimum line pressure to the hydraulic system. This low value for the line pressure is sufficient to tension the belt when the transmission is in neutral and no torque is being transmitted. By holding the line pressure to a minimum when no torque is being transferred to the drive output, the efficiency of engine operation is improved.

After controlling the PWM generator at block 74, program flow is returned to block 76. As the initial condition flag was reset at block 77 the system continues with block 78 where the filtered clutch pressure is altered to give an updated value. Assuming the transmission is now in start-up condition and the system will operate in open loop schedule, at decision block 82, the "yes" branch will be taken and the integrator IC flag will be set and the open loop 100 flag will be reset at block 83. Decision block 84 will then determine whether the set point filter IC flag is set. If the last cycle was in the open loop 0% controller, the set point filter IC flag will have been set at block 80 and the initial condition for the filtered set point will be determined at block 85 to be PMIN. The value of PMIN is the minimum pressure of the hydraulic regulator and will vary from application to application. Block 85 resets the set point filter IC flag so that on subsequent cycles in open loop schedule, block 85 will be by-passed. The filtered set point is then determined at block 86.

The set point is filtered in open loop schedule control so that the rate of change in the line pressure is slowed down during start up. As mentioned before, this is done to prevent undesirable clutch feel due to a sudden change in line pressure. The filtered value is determined by subtracting the cycle filtered set point from the actual set point and multiplying this difference by the constant BOLF. This quantity is then subtracted from the actual set point to create the filtered set point PLSET. The value of the filtered set point PLSF is then used to determine the output signal U1P at block 87. The output signal is a function of PSLF and the temperature of the fluid in the hydraulic circuit.

FIG. 4 shows a representative set of curves that are used to determine the output signal for three different schedules at three different temperatures. The actual schedule could however include as many or as few schedules and temperatures as required. In the particular example depicted, the schedules are a family of duty cycles. At a particular oil pressure, the algorithm will compute two signals U1P for that temperature bounded by the specific temperatures in the schedule. The algorithm then outputs the greater of these two values to ensure that more pressure than is called for by the set point is delivered to the secondary pulley. A more detailed description of the determination of the output signal U1P is found in copending application Ser. No. 936,527, now U.S. Pat. No. 4,982,822, mentioned earlier. The method of representing the schedule may be subject to change by the introduction of the pump flow to the regulator as a variable. The pump flow can be inferred as a function of the engine speed.

Returning to FIG. 3, once U1P for the open loop schedule has been determined, the signal is delivered to the PWM generator 74, which sends a signal to the line pressure regulator. Cycles in the open loop schedule mode will continue until the clutch is locked up and the operational mode switches to closed loop control.

In closed loop control mode, the system passes through blocks 76, 78, 79, and 82 before reaching block 88 where the set point filter IC flag is set. At decision block 89 the "no" branch will be followed because the system is attempting to go to closed loop mode and the pressure error will be calculated at block 90. The pressure error E1P is the difference between the set point pressure and the measured clutch pressure PCLU on line 51. The pressure error E1P is multiplied by the proportional gain KLP to give the modified error E2P.

Assuming the integrator IC flag is set, which will be the case each time the closed loop control is entered when the previous loop was either in open loop schedule control or open loop 100% or 0% control, at block 92 is 'yes' branch will be taken and decision block 93 will cause the system to determine whether the output duty cycle U1P is greater than the jump value that causes the PWM solenoid valve to go to its full-on position.

Decision block 93 determines whether it is appropriate for the system to be operating in the closed loop control and acts as a safeguard against operation in this controller when it is producing an output signal that corresponds to a PWM solenoid duty cycle that might produce an unstable control line pressure, i.e., greater than the jump value. The open 100% and the open 0% control strategies are the only two control strategies that precede the closed loop mode in this embodiment. Decision block 93 will therefore be encountered each time the system enters closed loop control. If the last value of the output signal U1P is determined to be greater than the value corresponding to the duty cycle jump value for the PWM solenoid valve at block 93, the system proceeds to block 94 where the open loop 100 and the integrator IC flags are set so that the next cycle is controlled by the open loop 100% control strategy so as not to produce an unstable line pressure control.

Once it has been determined that U1P is greater than the jump value, PSAVE is set equal to the pressure lower limit PSVLO, the value in the worst possible case, at block 95. When the integrator initial condition flag is set, the last cycle was not in the closed loop control mode. The clutch was not therefore locked up and the pressure obtained from the pressure transducer utilized to give the filtered clutch pressure is not therefore a true representation of the actual line pressure. PSAVE is therefore set equal to PSVLO, the pressure lower limit, to cover the worst possible case and to ensure that the system is not prematurely brought to closed loop control. The system then continues in open loop 100% control where U1P is set to be 100% to generate a 100% duty cycle at the PWM generator, and maximum line pressure is delivered to the hydraulic system.

The manner in which the open loop 100% control strategy determines whether the control system should be returned to the closed loop control strategy is discussed below in greater detail. Assuming for the moment that the previous value of U1P does not exceed the jump value, from block 93 the system will pass to block 96 where the initial conditions of the integrator are set. Each time the system returns to the closed loop control strategy from one of the other control strategies, the integrator initial conditions must be set again so that the first iteration does not produce an output signal that has a jump discontinuity. To achieve this aim the initial value for the integrator term E3P is set to the output signal U1P from the previous cycle less the proportional gain E2P. Block 96 also resets the integrator IC flag so that on subsequent cycles in the closed loop control mode, block 96 will be bypassed.

The integrator term E3P has limits on its output. Decision block 97 determines whether the integrator term E3P is greater than the jump value. If it is, the value of E3P is set to be the jump value at block 98. If E3P is not greater than the jump value the system proceeds directly to block 99. At block 99, if the pressure error E1P is negative, i.e., the clutch pressure is greater than PLSET and the integrator term E3P is less than the lower limit on the integrator, the system goes into hold where the previous value for E3P is retained to provide the output duty cycle. In all other cases the integrator term is recalculated at block 100. The new value is equal to the previous value plus the error signal E1P multiplied by a constant KLI, the integral gain. This new value for the integral term E3P is compared with the jump value at block 101. If E3P is less than the jump value, the output signal U1P for the closed loop is calculated at block 102. U1P is calculated to be the modified pressure error E2P plus the integrator term E3P. The inclusion of the proportional and integral terms in the output duty cycle U1P enables an optimal line pressure response to be provided by the proper choice of the gains KLP and KLI. The utilization of the two terms enables the output duty cycle in the closed loop mode to be derived solely from the output of the closed loop rather than requiring an input from the open loop schedule. This allows the two modes to be operated independently. The gains KLP and KLI can also be made functions of temperature to ensure stability and fast response over a wide range of operating conditions.

If the value for E3P is greater than the jump value, the closed loop mode is generating a steady state duty cycle that exceeds the predetermined jump value. The control is therefore more appropriately effected, by the open loop 100% control strategy The "yes" branch is followed to block 103 where the open loop 100% flag is set so that the next cycle will be controlled by the open loop 100% control strategy. The integrator IC flag is also set so that the next time the system returns to closed loop control the initial conditions will be set to avoid a jump discontinuity.

At block 104, the current filtered clutch pressure value is saved in the algorithm as PSAVE. This saved value is utilized in the open loop 100% control strategy to determine when it is appropriate to return to closed loop control. Block 105 compares PSAVE with the saved pressure lower limit PSVLO. PSVLO is representative of the worst case value for the pressure and is saved when there is no reliable filtered clutch pressure to record as described previously. If, however, the value is higher than this lower level, PSAVE remains equal to the filtered clutch pressure. If, however, the value is less than PSVLO, the value of PSAVE is set to PSVLO at block 106. Once the final value for PSAVE has been stored, the system proceeds to block 106 and the output signal U1P is put equal to 100%. This signal is translated into a maximum line pressure through the PWM generator 74 and the line pressure regulator 11.

Once the open loop 100% flag has been set, either at block 94 or block 103, at the next cycle, on reaching block 89, the "yes" branch will be taken. The new pressure set point is then compared with PSAVE at block 108 to determine whether the desired pressure set point has fallen sufficiently to enable the system to return to closed loop control. To prevent unnecessary switching between the modes (i.e. closed loop and 100%), instead of PLSET being compared directly with PSAVE, PLSET is compared with a value of PSAVE less a pressure hysteresis constant PHIST. If PLSET is still greater than the corrected value of PSAVE the system continues in open loop 100% control to provide a maximum line pressure to the hydraulic system. This is used as a safety factor since the relationship between percent duty cycle and line pressure varies with operating conditions.

Alternatively, if the value of PLSET has fallen sufficiently that it is no longer greater than the corrected PSAVE value, the system is returned to closed loop control. The system passes to block 109 where the open loop 100 flag is reset to prevent the system returning to the open loop 100% control strategy at the next cycle. The initial conditions for the integrator are then set at block 110. As the value of U1P is 100 on return to closed loop from open loop 100% it would not be appropriate to use U1P less the pressure error to determine the initial integrator condition because that might precipitate a jump discontinuity in the output duty cycle. The initial value for the integrator is therefore set at the jump value less a small hysteresis term DCHIST. This will prevent the system from toggling between the 100% open mode and the closed loop modes. As PLSET has fallen below PSAVE, the corrected jump value is a good approximation to the actual output duty cycle required.

In each of the modes described above, the system remains in the control strategy it is in for subsequent iterations unless acted upon in response to change in transmission conditions from outside this system or in response to the output signal in closed or open 100% mode. The system therefore has the versatility to change mode in response to transmission requirements and also in response to the output generated by the pressure set point. This ensures that the system is stable throughout its operation.

Figure 5:
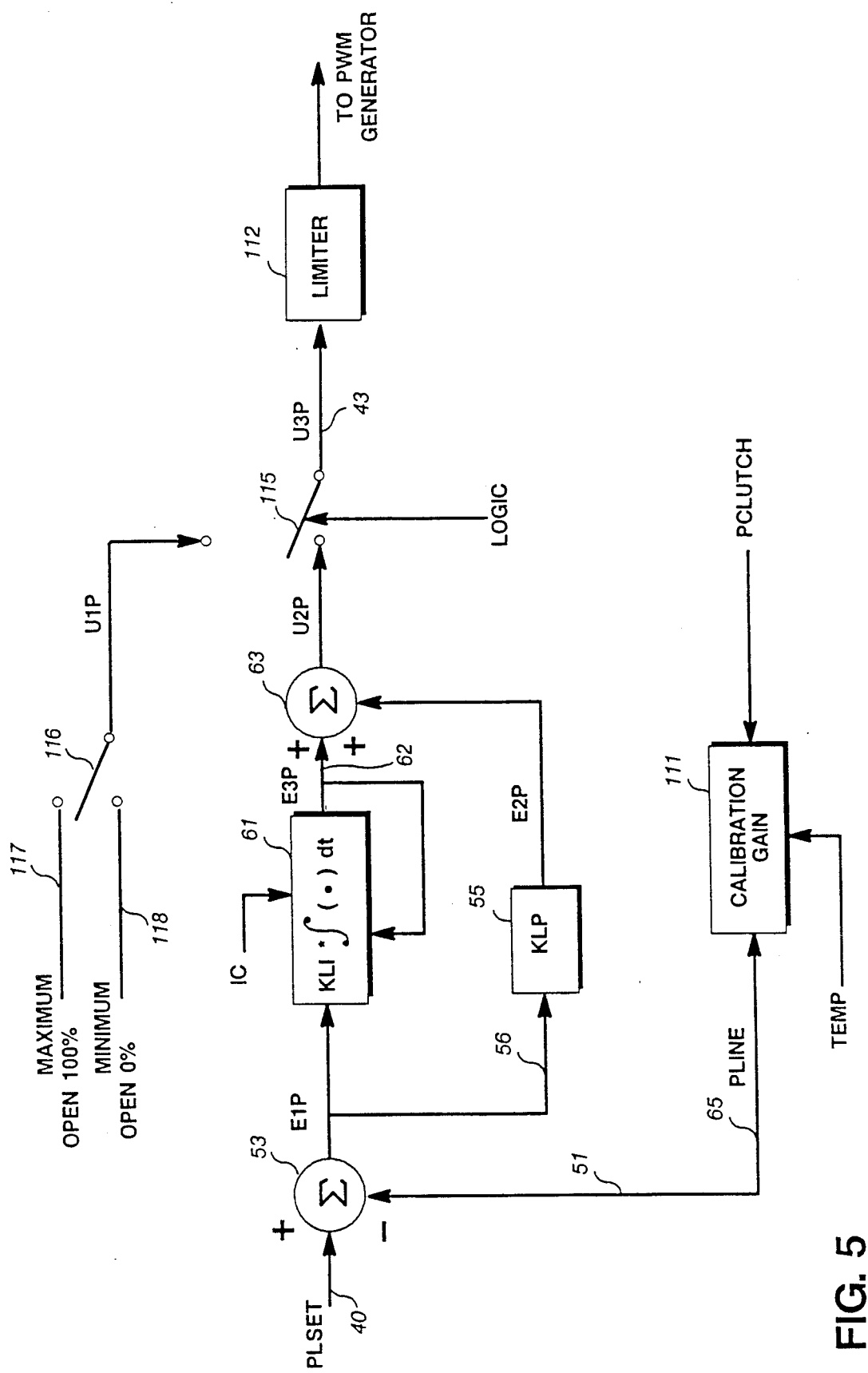
FIG. 5 is a block diagram representation of an alternative embodiment for line pressure control in a continuously variable transmission.
Figure 6A:
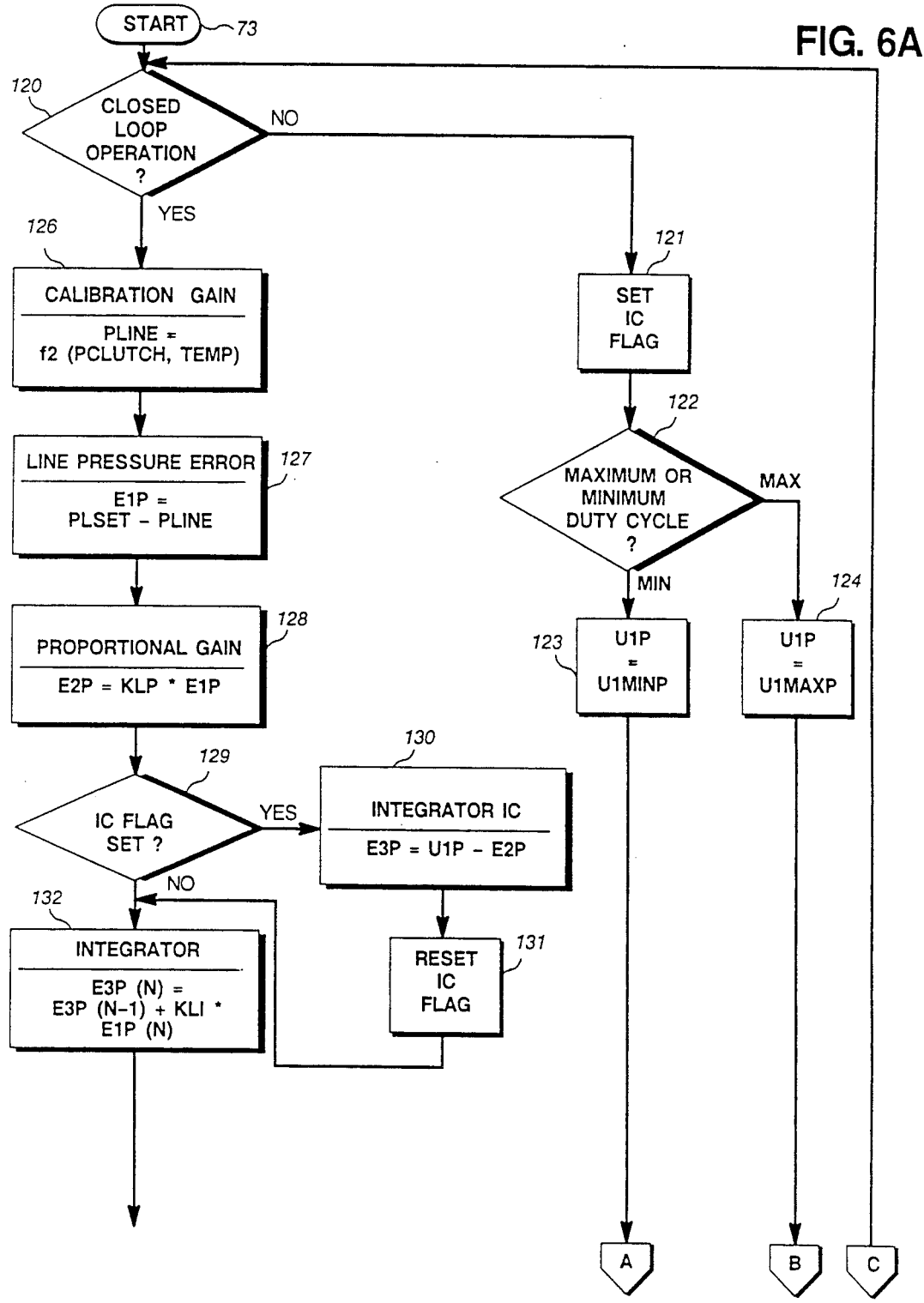
FIGS. 6A and 6B are flow charts of the operation of the alternative embodiment of FIG. 4.
Figure 6B:
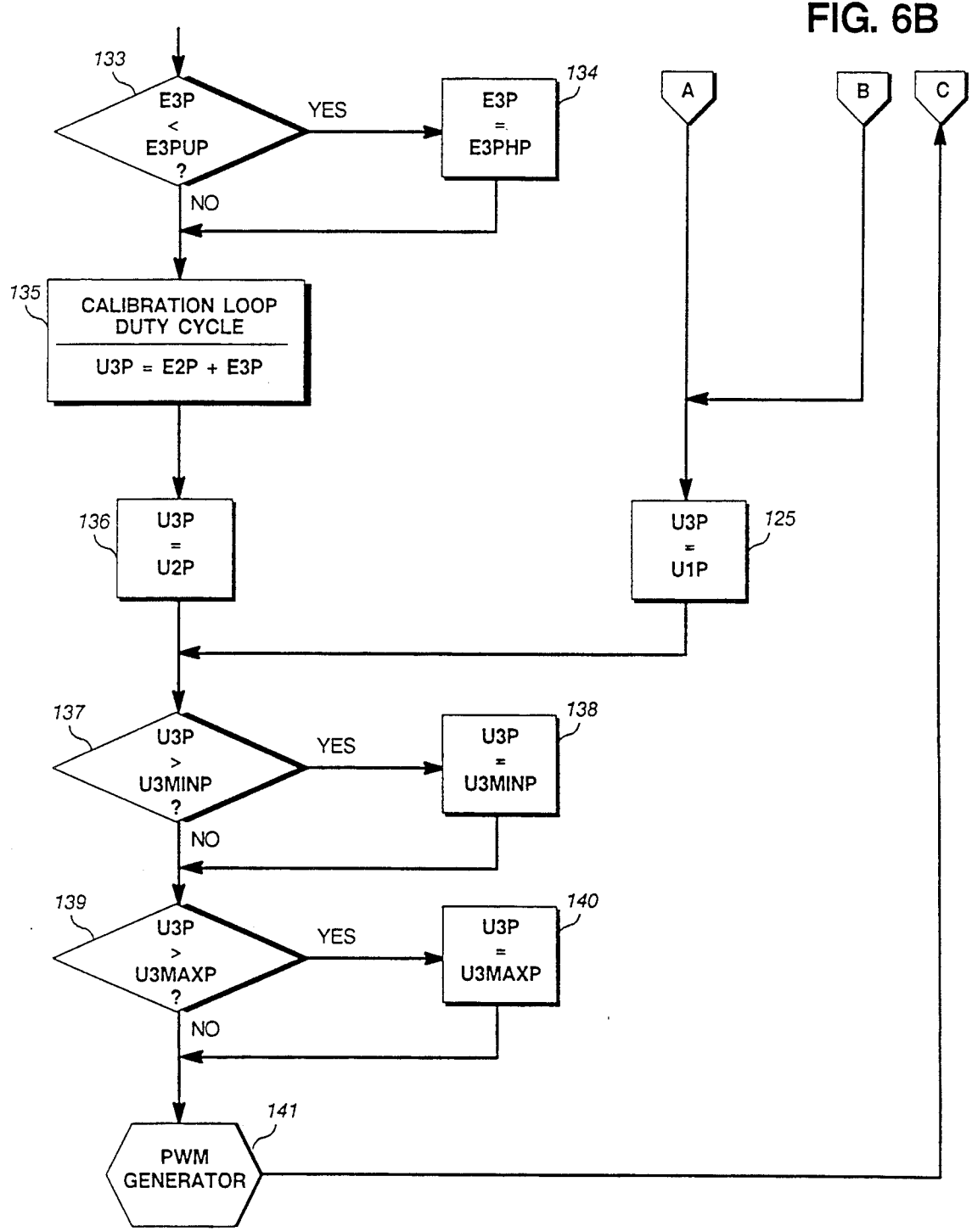

An alternative embodiment of the invention is shown in FIGS. 5-6. This embodiment provides a simplified control system that eliminates the open loop schedule control strategy and instead relies on the closed loop and open loop 0% and 100% control strategy to generate the output duty cycle under all operating conditions. The elimination of the open loop schedule reduces the system memory requirements. This system may be less efficient than a system also employing the open loop schedule mode that generates output duty cycles intermediate the full-on and full-off cycles, but in certain applications the advantages of reduced complication outweigh these disadvantages. For example, in systems having limited storage capacity and operating for the majority of time in closed loop control, the alternative embodiment of the present invention is desired.

In operation, the full-on duty cycle will be generated during start up mode and in extreme cold conditions, and the full-off duty cycle will be generated during neutral and hold modes. Since typically start-up lasts only a few seconds, loss of efficiency due to generating a full-on duty cycle that provides maximum line pressure during start-up instead of an open loop schedule that allows a variable line pressure to be achieved is likely to be minimal. The efficiency loss during operation of the open loop 100% control strategy in conditions of extreme cold may be more costly but such conditions of extreme cold are also likely to occur relatively infrequently. In normal operating conditions after clutch lock-up the system will be controlled by the closed loop control strategy. This control strategy is likely to control the system for a majority of the time.

Turning to FIG. 5, the system can be seen to be fairly similar to that of the previous embodiment of FIG. 2, the closed loop control strategy 37 with its proportional and integral gain terms being identical. To indicate this and other similarities between the embodiments, like elements have been designated with the same numerals in all the figures. The difference between the embodiments of FIG. 2 and FIG. 5 lies in the number and type of control strategies utilized and the inclusion of a calibration gain 111 and the limiter 112 in the embodiment of FIG. 5.

The limiter 112 is provided to ensure that the output duty cycle falls within the operational limits of the line pressure PWM solenoid valve 11. This is necessary because there is no provision for a transition to open loop 100% control when the output signal is above a "jump" limit. Therefore if a signal greater than the upper limit were to be generated it may cause the regulator to jump to full-on and result in undesirable unstable line pressure control. Of course the subsystem of the previously described embodiment could be utilized in this embodiment to effect a transition to open loop 100% control when the output duty cycle exceeds the maximum possible if this is desired.

The calibration gain 111 modifies the signal received from the pressure transducer to account for any drop in pressure that might occur as a result of leakage at the clutch pressure control valve and is dependent on oil temperature. The output from the calibration gain, PLINE on line 51 is used at summing junction 53 in the same manner as the signal PCLU on line 51 is utilized in the previously described embodiment, to develop an error signal representative of the difference between the actual and the desired line pressure.

Figure 9:
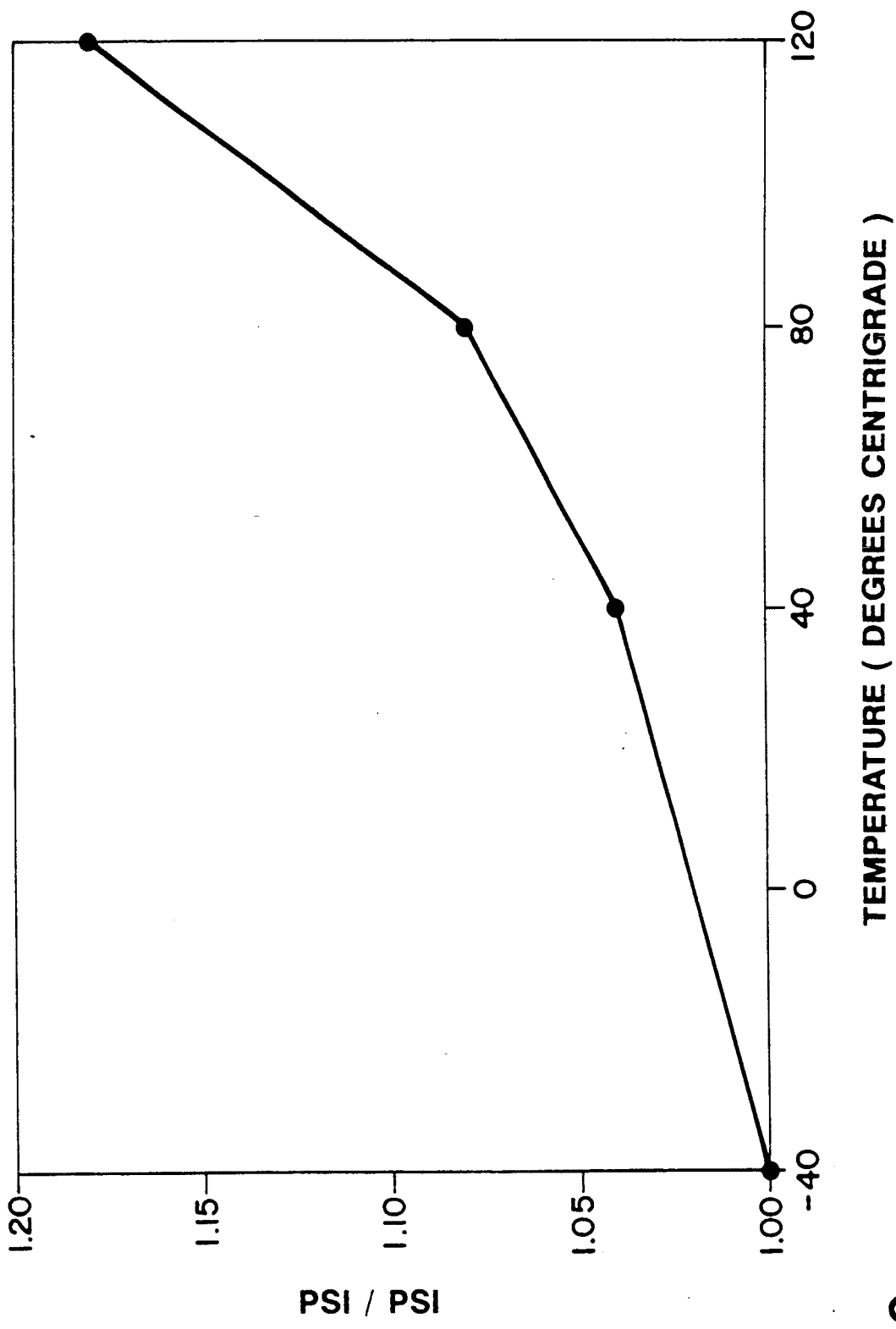
FIG. 9 is an exemplary schedule for calibration gain for use in the alternative embodiments of FIGS. 5-8.

An example of a plot used to calculate the calibration gain as a function of temperature can be found in FIG. 9. Interpolation between known values of temperature and pressure loss experimentally determined for each particular control valve provides a reasonable determination of the gain and reduces the amount of data that must be stored. A more detailed description of the operation of the calibration function can be found in copending application Ser. No. 936,527. As noted above, if the leakage at the clutch control valve is negligible, the calibration gain can be eliminated altogether.

A logic switch 115 is operable for connection to closed or open loop control strategies. When operating in open loop control the signal U1P delivered to the PWM generator is either open 0% or open 100% depending upon the position of logic switch 116. The logic switch 116 is operable between the maximum 100% open control signal on line 117 and the minimum 0% open control signal on line 118 to provide an output signal U1P that corresponds to the full-on or full-off signal of the PWM generator.

FIG. 6 shows a logic flow chart indicating the manner in which various functions of the embodiment of FIG. 5 can be implemented in software. As with the previously described embodiment, only those portions and subroutines that relate to the present invention are illustrated. Reference to FIG. 1 will clarify the operation in terms of the components of the continuously variable transmission.

On entering the system, at the start block 73 decision block 120 determines whether the system is to operate in open or closed loop control. If it is to operate open loop the "no" branch is taken to block 121 where the initial condition flag is set. At decision block 122 a determination is made as to whether the system is operating to generate a maximum or minimum duty cycle to provide maximum or minimum line pressure respectively in accordance with the transmission operation conditions.

In accordance with the decision at block 122, the output duty cycle U1P is set to either U1MIN at block 123 or U1MAX at block 124 to give respectively a minimum or maximum line pressure in the hydraulic system. At block 125 U3P is set equal to U1P prior to entry into the limiter sequence described in greater detail below.

The system operates in either of the open loop control strategy until the clutch is locked up and the pressure reading from the pressure transducer can be used to provide a representation of the line pressure. The closed loop control strategy will then be entered at block 120 and the system will progress to block 126 where the calibration gain is calculated. As previously discussed, this gain is a function of the clutch pressure obtained from the pressure transducer and the temperature of the oil.

Once PLINE has been determined the line pressure error E1P is calculated at block 127. E1P is the difference between the desired line pressure, PLSET and the determined value of PLINE. PLSET is a function of the transmission conditions as discussed in relation to the previously described embodiment and is determined in the same way. The error E1P is positive when PLSET is greater than PLINE and negative when the value of PLINE is greater than PLSET. After the line pressure error E1P has been determined, the proportional term E2P is calculated at block 128. The proportional gain term is calculated to be the error E1P multiplied by a constant KLP. Again, as in the previously described embodiment, the proportional gain KLP could be made a function of temperature and is derived from considerations of the transfer function of the line pressure regulator.

The system then proceeds to decision block 129 where a determination is made as to whether or not the initial condition flag is set. On the first closed loop cycle, the initial condition flag will be set because the previous cycle will have been under open loop control and block 121 would therefore have been encountered and the IC flag set. The integrator initial condition block 130 would therefore set the initial condition for the integrator. As in the previously described embodiment, this serves to prevent discontinuities in the output duty cycle when the operational mode is changed from open loop to closed loop control. Block 130 sets the initial condition of the integrator term E3P to be equal to the previous output duty cycle U1P which, on the first encounter, will be either the maximum or the minimum duty cycle less the proportional gain E2P. Closed loop control will, however, almost exclusively follow open loop maximum duty cycle because minimum duty cycle is usually utilized in neutral mode and the transmission is therefore likely to require a period at maximum duty cycle to enable the clutch to fully lock up so that closed loop control can resume. The initial condition of the integrator is therefore likely to be the maximum output duty cycle less the modified error signal E2P.

At block 131, the IC flag is reset so that on subsequent closed loop cycles block 130 is bypassed and the previous value of the integrator is utilized at block 132. On entering the integrator block 132, the current value for the integrator term is set equal to the previous value of the integrator term plus the error signal E1P multiplied by the integrator gain KLI. KLI can also be a function of temperature if required.

The system then proceeds to block 133 to determine whether the calculated integrator term is greater than a predetermined upper limit E3PUP. If it is, the system proceeds to block 134 where the integrator is set to its maximum possible value E3PUP. The closed loop duty cycle U2P is then calculated to be the sum of the proportional and integral gains at block 135 to optimize the response of the continuously variable transmission. As with the previously described embodiment, the closed loop output duty cycle is generated in its entirety in closed loop control. Block 136 performs a function similar to that of block 125 setting U3P equal to the current value of U2P.

Blocks 137 through 140 form part of both the open and closed loop control strategies and limit the value of the output duty cycle U3P to within predetermined upper and lower limits. At decision block 137, a determination is made as to whether the calculated value U3P is below the lower limit U3MINP. If it is, U3P is set equal to U3MINP at block 138, as a value lower than the minimum would not effect a lower line pressure in the hydraulic system.

At decision block 139 a determination as to whether U3P exceeds the upper limit E3MAXP for the duty cycle is made. If the value of U3P does exceed U3MAXP the value of U3P is set to the maximum value U3MAXP at block 140. The output duty cycle signal U3P is then provided to the PWM generator 141 to control the line pressure regulator valve 11 and the line pressure in the hydraulic system.

Figure 7:
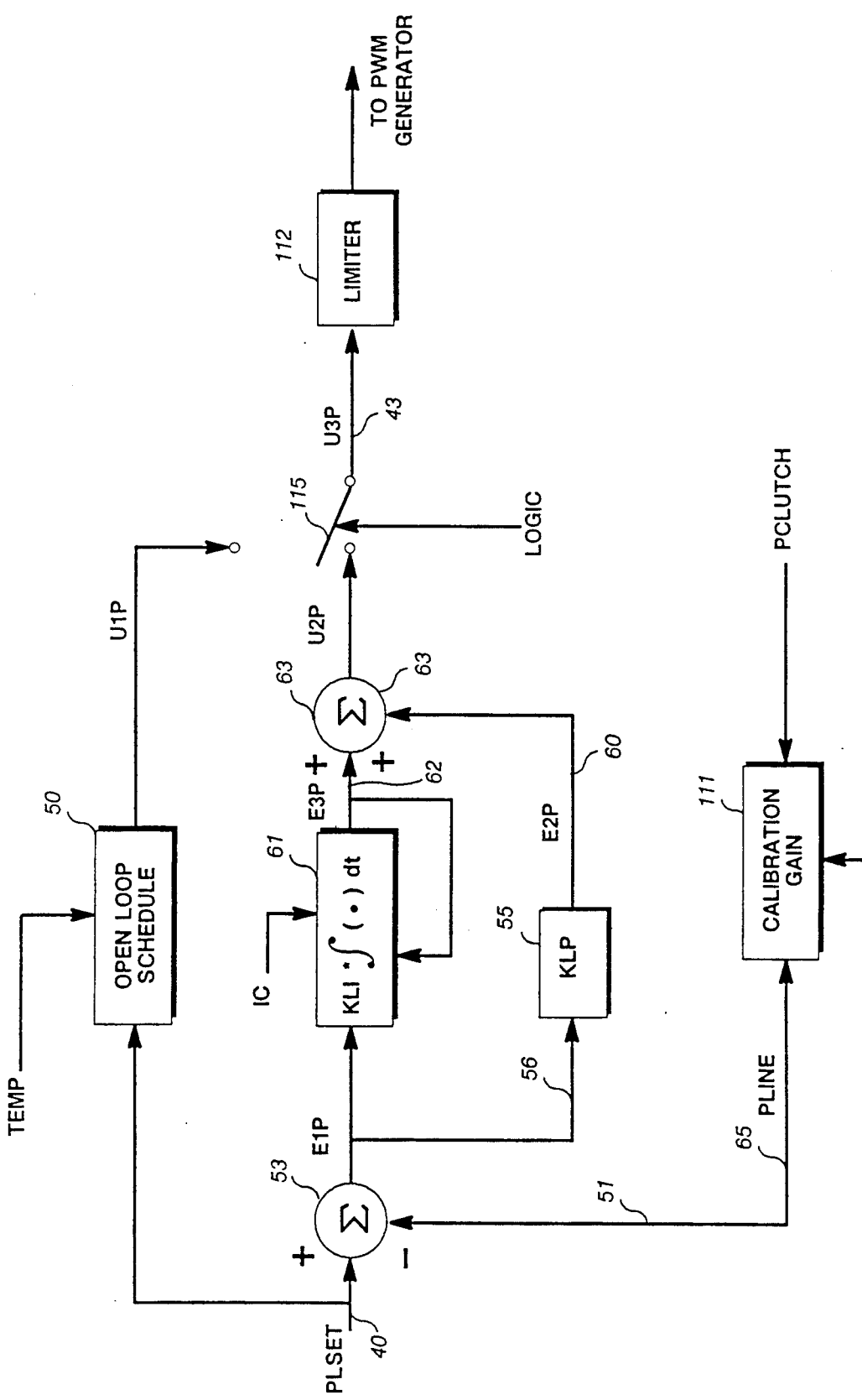
FIG. 7 is a block diagram for a second alternative embodiment for line pressure control in a continuously variable transmission.
Figure 8A:
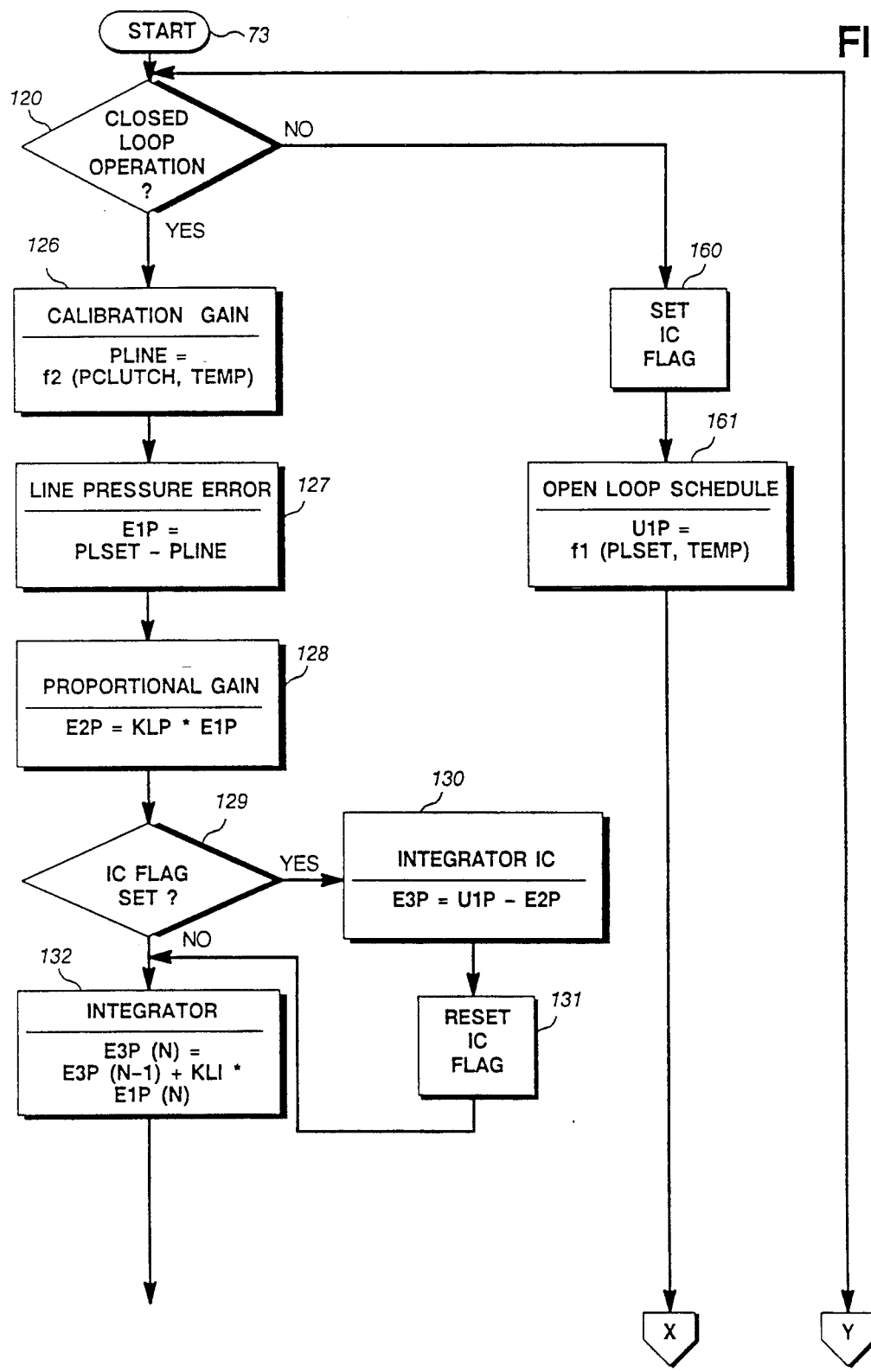
FIGS. 8A and 8B are flow charts of the operation of the second alternative embodiment of FIG. 7.
Figure 8B:
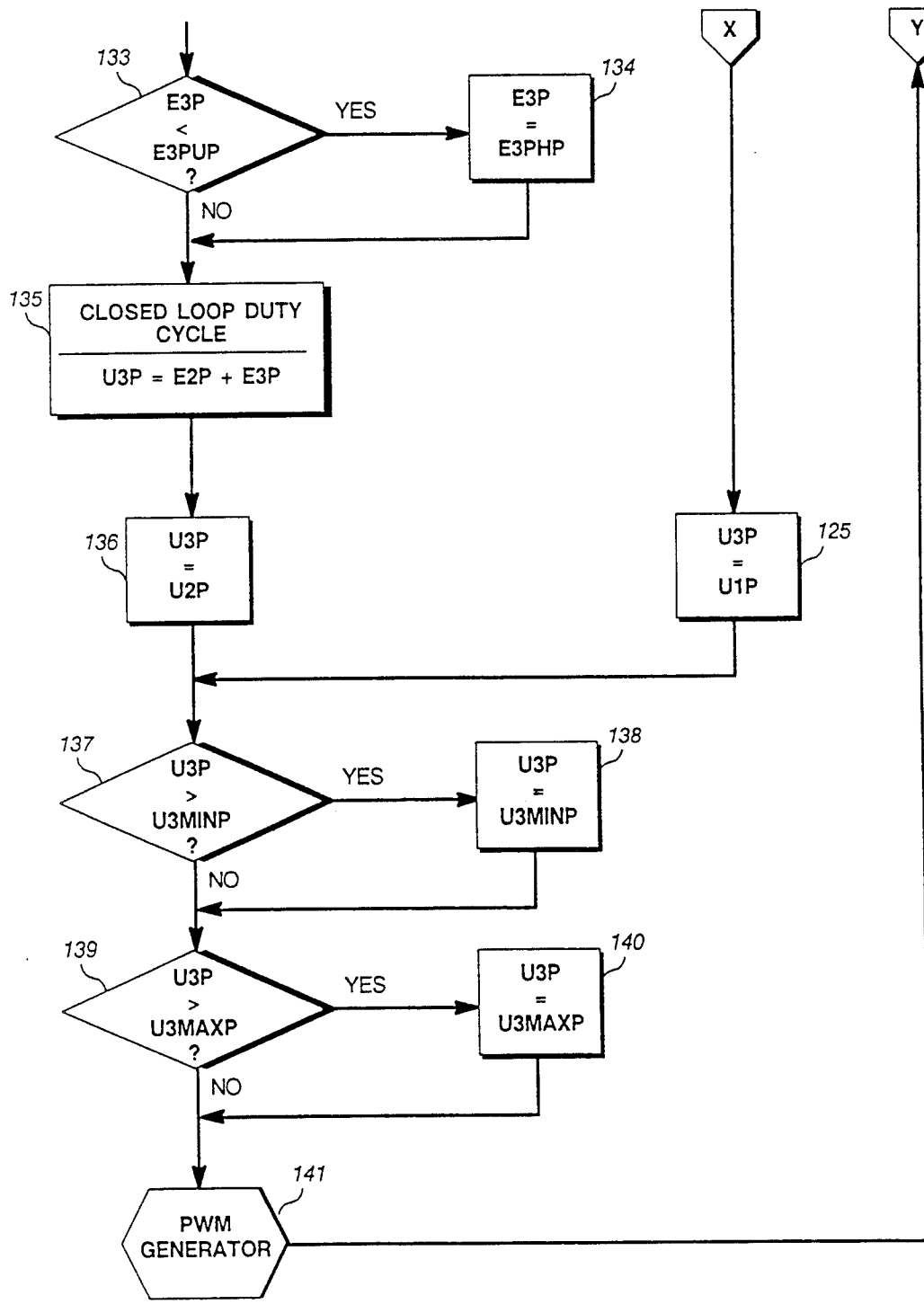

A final embodiment can be seen in FIGS. 7 and 8, with reference also to FIGS. 1, 4 and 9. The closed loop control of this embodiment is identical to that of the previous embodiment. The closed loop control and the operation of the limiter are therefore not described in relation to this embodiment, but like elements are numbered in accordance with the previous embodiment for clarity. The embodiment includes an open loop schedule in preference to the open 0% and open 100% control strategies of the previous embodiment. The gradation obtained from the open loop schedule between the extremes of maximum and minimum provides for more efficient operation of the continuously variable transmission than is possible with fixed outputs of the previous embodiment as the line pressure can be reduced when the maximum pressure is not necessary to prevent belt slippage.

This embodiment may be used in preference to the embodiment described previously when data storage capacity is not limited and efficiency is of greater concern. It must be remembered, however, that even during operation of an open loop schedule, loss of efficiency occurs. This is because there is no measure of the actual line pressure and all schedules must therefore be biased to ensure that there is sufficient line pressure to prevent slippage. It must also be remembered that closed loop control enables the most efficient operation to be achieved and that the periods during which closed loop control are not possible are fairly short.

Turning now to FIG. 7, it can be seen that the open loop maximum and minimum duty cycles of FIG. 5 have been replaced with an open loop schedule 50 that is dependent upon temperature. This schedule will operate in a similar manner to that described in relation to the embodiment of FIGS. 2-4. The schedule depicted in FIG. 4 is also an example of a schedule that can be utilized in this embodiment. All other features of the embodiment of FIGS. 5 and 6 are included in this embodiment.

Looking now at FIG. 8 a flow chart similar to that of FIG. 6 can be seen. The difference resides in the operation of the open loop control. Instead of the open loop control consisting of a choice between the maximum and minimum duty cycles an open loop schedule is provided. If, at block 120, the transmission is not operating in closed loop control, i.e. if the clutch is not locked up, the system is in open loop control and from block 120 the system proceeds to block 160 where the initial conditions flag is set. The duty cycle for the open loop schedule is then calculated at block 161 as a function of PLSET and temperature. The control sequence continues with the output duty cycle U1P being limited to ensure its value falls within the operational limits of the PWM regulator 11.

The invention encompasses a number of simplified control systems for a continuously variable transmission. The closed loop response is improved by the inclusion of both proportional and integral gain terms and by elimination of the requirement to include a signal from the open loop control strategy in the output signal U3P produced during closed loop control. The setting of initial conditions each time the system enters a particular control mode enables transitions to be made without discontinuities in the output.

The generation of maximum and minimum line pressures in start-up and neutral engine conditions without an open loop schedule simplifies the algorithm and substantially reduces the recorded data required for the control systems of this invention.

The change of control strategy in response to change in transmission requirements enables the line pressure to be regulated in the most appropriate manner for the prevailing operating conditions. In particular, the option of changing control strategy from closed to open 100% in response to output parameters prevents unstable response in the line pressure and enables stable operation to be achieved over a wide range of performance requirements as does return to closed control when the desired pressure falls below the level of a filtered pressure recorded on transition to open loop control.

The present invention has been described above in terms of a number of preferred embodiments. Those features that are deemed to be novel are set forth with particularity in the appended claims. Those skilled in the art to which the invention pertains may make modifications and other embodiments employing the principles of the invention, particularly upon considering the foregoing teachings.

What is claimed is:

1. A line pressure control system for controlling the line pressure in a continuously variable transmission, in which fluid under line pressure is regulated to produce an adjustable clutch fluid pressure for operating a clutch to transfer drive torque from an engine through the transmission to an associated drivetrain, having a pressure transducer operable to sense said clutch fluid pressure, said control system comprising:
    means for receiving a line pressure set point;
    closed loop pressure control means for executing a closed loop pressure control strategy in response to said sensed clutch fluid pressure to provide an output signal representative of an operating line pressure;
    at least one open loop pressure control means for executing at least one open loop pressure control strategy independent of said closed loop pressure control strategy to provide an output signal representative of an operating line pressure; and
    selection means for commencing operation of one of said control means.

2. The system of claim 1 wherein said selection means is responsive to the condition of said clutch and selects said closed loop pressure control means when said clutch is in locked-up condition.

3. The system of claim 2 wherein said at least one open loop pressure control means comprises, at least;
    an open loop pressure control means for providing an output signal representative of a maximum line pressure; and
    another open loop pressure control means for providing an output signal representative of a minimum line pressure.

4. The system of claim 2 wherein said at least one open loop pressure control means comprises:
    first open loop pressure control means responsive to a said line pressure set point for providing an output signal representative of an operating line pressure.

5. The system of claim 4 wherein said at least one open loop pressure control means further comprises:
    second open loop pressure control means for providing an output signal representative of a maximum line pressure; and
    third open loop pressure control means for providing an output signal representative of a minimum line pressure.

6. The system of claim 3 wherein said selection means is responsive to a transmission start-up condition and selects said means for providing a maximum line pressure in response to said transmission start-up condition.

7. The system of claim 3 wherein said selection means is responsive to a transmission neutral condition and selects said means for providing a minimum line pressure in response to said transmission neutral condition.

8. The system of claim 2 wherein said closed loop pressure control means includes means for setting initial conditions each time the system commences operation of said closed loop pressure control means and discontinues operation of one of said at least one open loop pressure control means.

9. The system of claim 4 wherein said at least one open loop pressure control means includes means for setting initial conditions each time the system commences operation of one of said at least one open loop pressure control means and discontinues operation of another of said pressure control means.

10. The system of claim 2 wherein said closed loop pressure control means includes means responsive to an output signal generated for causing said selection means to commence operation of one of at least one open loop pressure control means wherein said output signal is representative of a maximum line pressure.

11. The system of claim 10 further comprising means for storing a representative measure of the clutch pressure each time operation of said closed loop pressure control means is discontinued and one of said open loop pressure control means commences operation.

12. The system of claim 11 wherein said representative measure of the clutch pressure is a filtered clutch pressure.

13. The system of claim 12 further comprising:
means for comparing said stored representative measure of the clutch pressure with said line pressure set point; and
means for commencing operation of said closed loop pressure control means when said stored representative measure of the clutch pressure exceeds said desired line pressure set point.

14. The system of claim 2 wherein said output signal representative of a required line pressure in said closed loop control strategy includes a proportional term and an integral term each calculated as a function of the difference between an actual line pressure and a said line pressure set point.

15. The system of claim 4 or 5 wherein said first open loop pressure control means is an open loop schedule.

16. The system of claim 15 wherein said open loop schedule comprises an algorithm holding data points for a family of schedule curves as a function of temperature, said algorithm interpolating between said data points to provide an output signal for each said line pressure set point.

17. A line pressure control system for controlling the line pressure in a continuously variable transmission, in which fluid under line pressure is regulated to produce an adjustable clutch fluid pressure for operating a clutch to transfer drive torque from an engine through the transmission to an associated drivetrain, having a pressure transducer operable to sense said clutch fluid pressure, said control system comprising:
means for receiving a line pressure set point;
closed loop pressure control means responsive to said sensed clutch fluid pressure for providing an output signal representative of an operating line pressure;
open loop schedule pressure control means responsive to said line pressure set point for providing an output signal representative of an operating pressure;
open loop maximum pressure control means for providing an output signal representative of a maximum line pressure;
open loop minimum pressure control means for providing an output signal representative of a minimum line pressure;
means for comparing said closed loop output signal with a predetermined threshold value; and
selection means for discontinuing operation of said closed loop pressure control means and commencing operation of said open loop maximum pressure control means in accordance with a predetermined relation between said closed loop output signal and said predetermined threshold value;
said closed loop pressure control means, open loop schedule pressure control, open loop maximum pressure control, and open loop minimum pressure control means operating independently.

18. The system of claim 17 wherein said fluid under line pressure is regulated by a pulse width modulating solenoid valve and wherein said predetermined threshold value is compared to a duty cycle signal received by said solenoid valve.

19. The system of claim 18 wherein said predetermined relation between said closed loop pressure control means and said predetermined threshold value causes the commencement of operation of said open loop schedule control means when the output signal from said closed loop pressure control means corresponds to a duty cycle falling between 85% and 95%.

20. The system of claim 18 further comprising means to commence operation of said closed loop pressure control means and discontinue operation of said open loop maximum control strategy in response to said line pressure set point for said system.

21. The system of claim 20 wherein said means to commence operation of said closed loop pressure control means includes:
means for storing a value representative of the actual line pressure when operation of said open loop maximum pressure control means commences and operation of said closed loop pressure control means is discontinued;
means for comparing said line pressure set point with said stored value representative of the actual line pressure; and
means for commencing operation of said closed loop pressure control means in accordance with a predetermined relation between said line pressure and said stored value.

22. The system of claim 17 further comprising means for setting initial conditions for determination of the operating line pressure each time the system commences operation of said closed loop pressure control means and discontinues operation of another of said other pressure control means.

23. The system of claim 17 further comprising means for setting initial conditions for determination of the operating line pressure each time the system commences operation of said open loop schedule pressure control means and discontinues operation of another of said other pressure control means.

24. The system of claim 17 wherein operation of the open loop maximum pressure control means commences in accordance with a predetermined relation between an output reading from the previous cycle and a predetermined threshold value.

25. The system of claim 24 wherein said threshold value is representative of a duty cycle of between 85% and 95%.

26. The system of claim 25 further comprising control transfer means to commence operation of said closed loop pressure control means and discontinue operation of said open loop maximum control strategy in response to said line pressure for said system.

27. The system of claim 26 wherein said control transfer means includes:
means for storing a value representative of the actual line pressure when operation of said open loop maximum pressure control means commences and operation of said closed loop pressure control means is discontinued;
means for comparing said line pressure with said stored value; and
means for commencing operation of said closed loop pressure control means in accordance with a predetermined relation between said line pressure and said stored value.

28. The system of claim 17 wherein said open loop schedule pressure control means performs an algorithm comprising the retrieval of data points for a family of schedule curves as a function of temperature, said algorithm interpolating between said data points to provide an output signal for each line pressure set point.

29. The system of claim 17 comprising means to commence operation of said open loop maximum pressure control means in response to a low operating temperature.

30. A line pressure control system for controlling the line pressure in a continuously variable transmission, in which fluid under line pressure is regulated to produce an adjustable clutch fluid pressure for operating a clutch to transfer drive torque from an engine through the transmission to an associated drivetrain, having a pressure transducer operable to sense said clutch fluid pressure, said control system comprising:
means for receiving a line pressure set point;
closed loop pressure control means responsive to said sensed clutch fluid pressure for providing an output signal representative of an operating line pressure;
open loop maximum pressure control means for providing an output signal representative of a maximum line pressure;
open loop minimum pressure control means for providing an output signal representative of a minimum line pressure; and
selection means for commencing operation of one of said control means for operation;
said closed loop pressure, open loop maximum pressure, and open loop minimum pressure control means operating independently.

31. The system of claim 30 further comprising means for setting the initial conditions for determination of the operating line pressure each time the system commences operation of said closed loop control and discontinues operation of one of said other control means strategies.

32. The system of claim 30 further comprising means for setting initial conditions for determination of the operating line pressure each time the system commences operation of said open loop schedule control and discontinues operation of one of said other control means.

33. The system of claim 30 wherein said selection means includes means to commence operation of said open loop maximum line pressure in response to a low operating temperature.

34. The system of claim 30 wherein said selection means is responsive to a transmission start-up condition and commences operation of said open loop minimum control strategy in response to said transmission start-up condition.

35. The system of claim 30 wherein said selection means is responsive to a transmission neutral condition and commences operation of said open loop minimum control strategy in response to said transmission neutral condition.

36. The system of claim 30 further comprising a limiter to ensure that said output signal representative of a required line pressure falls between predetermined limits.

37. A line pressure control system for controlling the line pressure in a continuously variable transmission, in which fluid under line pressure is regulated to produce an adjustable clutch fluid pressure for operating a clutch to transfer drive torque from an engine through the transmission to an associated drivetrain, having a pressure transducer operable to sense said clutch fluid pressure, said control system comprising:
means for receiving a line pressure set point;
closed loop pressure control means for providing an output signal representative of an operating line pressure in response to a sensed clutch fluid pressure;
open loop schedule control means independent of said closed loop pressure control means for providing an output signal representative of an operating pressure in response to said line pressure set point; and
selection means for commencing operation of one of said control means.

38. The system of claim 37 further comprising a limited to ensure that said output signal representative of an operating line pressure falls between predetermined limits.

39. The system of claim 37 including means for setting the initial conditions for determination of the operating line pressure each time the system commences operation of said closed loop pressure control means and discontinues operation of one of said other control means.

40. The system of claim 37 including means for setting initial conditions for determination of the operating line pressure each time the system commences operation of said open loop schedule pressure control means and discontinues operation of one of said other control means.

41. A method for controlling the line pressure in a continuously variable transmission having a pressure transducer associated with a drive torque transfer clutch, said method comprising:
sensing the pressure at said pressure transducer associated with said clutch;
generating a first operating line pressure control signal in response to said sensed clutch pressure;

generating a second operating line pressure control signal independent of said sensed clutch pressure; and selecting one of said first and second operating line pressure control signals for controlling line pressure.

42. The method of claim 41 further comprising:

receiving a line pressure set point signal;

generating said second operating line pressure control signal in response to said received line pressure set point signal.

43. The method of claim 41 further including:

generating a maximum operating line pressure control signal; and selecting one of said first, second and maximum line pressure control signals for controlling line pressure.

44. The method of claim 41 further including:

generating a minimum operating line pressure control signal; and selecting one of said first, second and minimum line pressure control signals for controlling line pressure.

45. The method of claim 42 further including:

generating a minimum operating line pressure control signal; and selecting one of said first, second and minimum line pressure control signal for controlling line pressure.

46. The method of claim 45 further including:

generating a maximum operating line pressure control signal; and selecting one of said first, second, minimum and maximum line pressure control signals for controlling line pressure.

* * * * *